US010340815B2

(12) United States Patent
Kitazawa et al.

(10) Patent No.: US 10,340,815 B2
(45) Date of Patent: Jul. 2, 2019

(54) LIQUID EJECTING APPARATUS AND CIRCUIT BOARD

(71) Applicant: SEIKO EPSON CORPORATION, Tokyo (JP)

(72) Inventors: Koji Kitazawa, Nagano (JP); Dai Nozawa, Nagano (JP); Toru Kashimura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/832,899

(22) Filed: Dec. 6, 2017

(65) Prior Publication Data

US 2018/0183352 A1 Jun. 28, 2018

(30) Foreign Application Priority Data

Dec. 22, 2016 (JP) ................................ 2016-248824

(51) Int. Cl.
*B41J 2/045* (2006.01)
*H02M 7/483* (2007.01)

(52) U.S. Cl.
CPC ........... *H02M 7/483* (2013.01); *B41J 2/0458* (2013.01); *B41J 2/04541* (2013.01); *B41J 2/04581* (2013.01)

(58) Field of Classification Search
CPC ................ B41J 2/04541; B41J 2/04581; B41J 2/04588; B41J 2/0455; B41J 2/17526; B41J 2002/14491
See application file for complete search history.

(56) References Cited

U.S. PATENT DOCUMENTS

| | | | | | |
|---|---|---|---|---|---|
| 2002/0196078 | A1 | 12/2002 | Honda et al. | | |
| 2004/0189758 | A1 * | 9/2004 | Alexia | B41J 2/17526 | 347/87 |
| 2009/0218117 | A1 * | 9/2009 | Sakai | H05K 3/0061 | 174/254 |
| 2010/0194826 | A1 * | 8/2010 | Kondo | B41J 2/14233 | 347/71 |
| 2015/0246530 | A1 | 9/2015 | Abe et al. | | |

(Continued)

FOREIGN PATENT DOCUMENTS

| | | | |
|---|---|---|---|
| EP | 2789463 | A1 | 10/2014 |
| JP | 2002-330035 | A | 11/2002 |

(Continued)

OTHER PUBLICATIONS

The Extended European Search Report for the corresponding European Patent Application No. 17208449.3 dated May 14, 2018.

*Primary Examiner* — John Zimmermann

(57) ABSTRACT

A liquid ejecting apparatus includes a first ejecting section that includes a first drive element and ejects liquid by driving the first drive element, a first drive circuit that includes a first transistor and outputs a first drive signal to the first drive element, a second drive circuit that includes a second transistor and outputs a second drive signal to the first drive element, a circuit substrate on which the first drive circuit and the second drive circuit are mounted. The first drive circuit is mounted on a first surface of the circuit substrate, and the second drive circuit is mounted on a second surface of the circuit substrate, and the first transistor and the second transistor are disposed at position that do not overlap one another in plan view of the circuit substrate.

12 Claims, 14 Drawing Sheets

(56) References Cited

U.S. PATENT DOCUMENTS

| | | | |
|---|---|---|---|
| 2015/0273821 A1 | 10/2015 | Abe et al. | |
| 2015/0382445 A1* | 12/2015 | Choi | H05K 1/115 174/251 |
| 2016/0339690 A1 | 11/2016 | Matsumoto | |
| 2017/0087833 A1* | 3/2017 | Sugiura | B41J 2/14072 |

FOREIGN PATENT DOCUMENTS

| | | |
|---|---|---|
| JP | 2010-221500 A | 10/2010 |
| JP | 2013-120861 A | 6/2013 |
| JP | 2016-215523 A | 12/2016 |

* cited by examiner

LIQUID EJECTING APPARATUS AND CIRCUIT BOARD

BACKGROUND

1. Technical Field

The present invention relates to a liquid ejecting apparatus and a circuit substrate.

2. Related Art

As a liquid ejecting apparatus such as an ink jet printer that ejects ink and prints images and documents, a liquid ejecting apparatus using a piezoelectric element is known. Piezoelectric elements are provided so as to correspond to respective nozzles in a head (ink jet head), and a specific amount of ink (liquid) is ejected from a corresponding nozzle at a certain timing and a dot is formed when each of the piezoelectric elements is driven in accordance with a drive signal. Electrically, the piezoelectric element is a capacitive load such as a capacitor, and therefore, a sufficient current is supplied to cause the piezoelectric element of each of the nozzles to operate. Therefore, in the above-described liquid ejecting apparatus, the drive circuit supplies, to the head, a drive signal that has been amplified by an amplifier circuit and drives the piezoelectric element.

For example, in a liquid ejecting apparatus such as an ink jet printer, two or more head units each including two or more heads may be provided in order to facilitate high-speed printing, high-resolution image printing, and the like. In addition, in the liquid ejecting apparatus in which the two or more head units are provided, typically, drive circuits corresponding to the two or more head units are provided.

For example, in JP-A-2010-221500, there has been proposed a liquid ejecting apparatus in which two or more drive circuits corresponding to two or more head units are mounted on a single substrate.

However, in the invention proposed in JP-A-2010-221500, in the liquid ejecting apparatus in which the two or more head units are provided, typically, the two or more drive circuits corresponding to the two or more head units are provided, and therefore, it is difficult to reduce the size of the circuit substrate on which the drive circuits are mounted.

In addition, a drive signal used to drive a head including an ejecting section that ejects ink is a signal having a large amplitude, and heat is generated in the drive circuit when generating a drive signal. Therefore, when the size of the circuit substrate is reduced, heat generated in the drive circuit concentrates at the circuit substrate, and a failure of the drive circuit or other problems may occur. Therefore, in order to reduce the size of the circuit substrate, arrangement of heating components and the like have to be considered.

SUMMARY

An advantage of some aspects of the invention is that a liquid ejecting apparatus in which the size of a circuit substrate on which drive circuits are mounted can be reduced, and the circuit substrate, can be provided, and deterioration of characteristics of the drive circuits due to heat generated in the drive circuits can be suppressed by dispersing the heat.

The invention can be realized as the following embodiments or application examples.

Application Example 1

A liquid ejecting apparatus according to this application example includes a first ejecting section that includes a first drive element and ejects liquid by driving the first drive element, a first drive circuit that includes a first transistor and outputs a first drive signal to the first drive element, a second drive circuit that includes a second transistor and outputs a second drive signal to the first drive element, and a circuit substrate on which the first drive circuit and the second drive circuit are mounted. The first drive circuit is mounted on a first surface of the circuit substrate, the second drive circuit is mounted on a second surface of the circuit substrate, and the first transistor and the second transistor are disposed at positions that do not to overlap one another in plan view of the circuit substrate.

The first drive element may be, for example, a piezoelectric element or a heating element.

In the liquid ejecting apparatus according to this application example, the drive circuits that respectively output the drive signals to the first drive element are mounted on the first surface and second surface of the circuit substrate, and therefore, the size of the circuit substrate can be reduced.

In addition, the transistors which generate the largest heat from among components mounted on the drive circuits of the first surface and the second surface are disposed on the respective surfaces of the substrate so as not to overlap one another, and therefore, heat generated in the circuit substrate can be dispersed, and a failure and deterioration of characteristics of the drive circuits due to the heating of the drive circuits, can be reduced.

Application Example 2

In the liquid ejecting apparatus according to the above application example, an implementation area of the first drive circuit and an implementation area of the second drive circuit may at least partially overlap one another in plan view of the circuit substrate.

In the liquid ejecting apparatus according to this application example, the drive circuits are disposed on the first surface and second surface of the circuit substrate so as to at least partially overlap one another, and therefore, the size of the circuit substrate can be further reduced.

Application Example 3

In the liquid ejecting apparatus according to the above application examples, the first drive circuit includes a first modulation circuit that generates a first modulation signal obtained by pulse-modulating a first source signal, a first amplification section that includes the first transistor and a third transistor, and amplifies the first modulation signal to generate a first amplification modulation signal, and a first demodulation circuit that demodulates the first amplification modulation signal to generate the first drive signal, and the second drive circuit includes a second modulation circuit that generates a second modulation signal obtained by pulse-modulating a second source signal, a second amplification section that includes the second transistor and a fourth transistor, and amplifies the second modulation signal to generate a second amplification modulation signal, and a second demodulation circuit that demodulates the second amplification modulation signal to generate the second drive signal, and the first transistor may be disposed at a position that overlaps with neither the second transistor nor the fourth transistor, and the third transistor may be disposed at a position that overlaps with neither the second transistor nor the fourth transistor in plan view of the circuit substrate.

The drive circuit of the liquid ejecting apparatus according to this application example generates a drive signal by class D amplification. When the drive circuit generates a drive signal by the class D amplification, power consumption and a calorific value are reduced, and the number of heat dissipation heat sinks and an area for the heat sinks can be reduced, compared with a case where the drive circuit generates a drive signal by class A/B amplification, and therefore, the size and weight of the drive circuit can be reduced. Thus, in the liquid ejecting apparatus according to this application example, the size reduction can be further allowed.

Application Example 4

In the liquid ejecting apparatus according to the above application examples, the first demodulation circuit may include a first coil, the second demodulation circuit may include a second coil, and the first coil and the second coil may be disposed at positions that do not overlap one another in plan view of the circuit substrate.

The coil in the drive circuit generates the second largest heat next to the transistor. In the liquid ejecting apparatus according to this application example, when the coil of the drive circuit mounted on the first surface and the coil of the drive circuit mounted on the second surface are disposed on the respective surfaces of the circuit substrate so as to not to overlap one another, the heat in the circuit substrate can be further dispersed.

In addition, the coils in the respective drive circuits interfere with each other due to leakage flux, or the like, thereby affecting the ejecting characteristic. In the liquid ejecting apparatus according to this application example, when the coils of the respective drive circuits are disposed on the respective surfaces of the circuit substrate so as not to overlap one another, the mutual interference of the coils mounted on the first surface and second surface is suppressed, and therefore, a good ejecting characteristic is likely to be obtained.

Application Example 5

In the liquid ejecting apparatus according to the above application examples, the first drive signal and the second drive signal may be output to the first drive element exclusively.

One of factors of heating of the drive circuits is heating due to a current supplied from the drive circuits to the first drive element. In the liquid ejecting apparatus according to this application example, the drive circuits mounted on the respective surfaces of the circuit substrate do not output signals to the first drive element at the same time, and therefore, consumption of a current can be suppressed, and the heating of the drive circuits can be further reduced.

Application Example 6

In the liquid ejecting apparatus according to the above application examples, an amplitude of the first drive signal may be larger than an amplitude of the second drive signal.

When the drive circuits output the same current, larger heat is generated by a drive circuit that outputs a drive signal having a large amplitude. In the liquid ejecting apparatus according to this application example, when the drive circuits having different amplitudes of the drive signals, that is, different calorific values are mounted on the first and second surfaces of the circuit substrate, heat generated by the drive circuit on the first surface and heat generated by the drive circuit on the second surface of the circuit substrate can be further dispersed.

Application Example 7

The liquid ejecting apparatus according to the above application examples further includes a second ejecting section that includes a second drive element and ejects liquid by driving the second drive element and a third drive circuit that includes a fifth transistor and outputs a third drive signal to the second drive element, and the third drive circuit is mounted on the first surface of the circuit substrate, and an amplitude of the first drive signal may be larger than an amplitude of the third drive signal.

In the liquid ejecting apparatus according to this application example, a drive circuit that outputs a drive signal having a large amplitude to the first drive element and a drive circuit that outputs a drive signal having a small amplitude to the second drive element are mounted on the same surface of the circuit substrate, and therefore, the drive circuits each having a large calorific value are not concentrated on the same surface of the circuit substrate, and heat that has been generated in the drive circuits can be further dispersed.

Application Example 8

The liquid ejecting apparatus according to the above application examples further includes a third ejecting section that includes a third drive element and ejects liquid by driving the third drive element and a fourth drive circuit that includes a sixth transistor and outputs a fourth drive signal to the third drive element, and the fourth drive circuit is mounted on the first surface of the circuit substrate, and an amplitude of the fourth drive signal may be larger than the amplitude of the third drive signal, and a distance between the first transistor and the fifth transistor may be smaller than a distance between the first transistor and the sixth transistor.

In the liquid ejecting apparatus according to this application example, in the circuit substrate on which the two or more drive circuits are provided, the drive circuits which output a drive signal having a large amplitude and the drive circuits which output of a drive signal having a small amplitude are disposed in an alternating pattern on the same surface of the circuit substrate.

Therefore, in the liquid ejecting apparatus according to this application example, the drive circuits having a large calorific value are not concentrated on the same surface of the circuit substrate, and the heat that has been generated in the drive circuits can be further dispersed.

Application Example 9

In the liquid ejecting apparatus according to the above application examples, the first ejecting section and the circuit substrate may be mounted on a movable carriage.

In the liquid ejecting apparatus according to this application example, a wiring length from the drive circuit to the ejecting section can be reduced and therefore a drive signal having good waveform accuracy can be applied to the drive element, and liquid can be ejected accurately.

Application Example 10

A circuit substrate according to this application example includes a first drive circuit that includes a first transistor and outputs a first drive signal that drives a drive element and a second drive circuit that includes a second transistor and outputs a second drive signal that drives the drive element. The first drive circuit is mounted on a first surface of the circuit substrate, and the second drive circuit is mounted on a second surface of the circuit substrate, and the first transistor and the second transistor are disposed at positions that do not overlap one another in plan view of the circuit substrate.

In the circuit substrate according to this application example, the drive circuits that output drive signals to the drive element are respectively mounted on the first surface and the second surface of the circuit substrate, and therefore, the size of the circuit substrate can be reduced.

In addition, when the transistors which generate the largest heat from among components mounted on the drive circuits of the first surface and the second surface are disposed on the respective surfaces of the substrate so as not to overlap one another, heat generated in the drive circuits can be dispersed, and a failure and deterioration of characteristics of the drive circuit, which are caused by the heating, can be reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

The preferred embodiments of the invention are described below in detail with reference to the drawings. The drawings are used for convenience of explanation. The embodiment described herein does not unreasonably limit the contents of the invention. In addition, not all the configurations described below are essential components of the invention.

1. First Embodiment

1-1. Overview of Liquid Ejecting Apparatus

A printing apparatus as an example of a liquid ejecting apparatus according to an embodiment is an ink jet printer that forms an ink dot group on a printing medium such as paper by ejecting ink in accordance with image data supplied from an external host computer and that prints an image (which may include characters and figures) corresponding to the image data.

As the liquid ejecting apparatus, for example, there is a printing apparatus such as a printer, a color material ejecting apparatus used for manufacturing of a color filter of a liquid crystal display or the like, an electrode material ejecting apparatus used for forming of electrodes of an organic electroluminescence (EL) display, a field emission display (FED), or the like, a bioorganic material ejecting apparatus used for manufacturing of a biochip, a three-dimensional modeling apparatus (a so-called 3D printer), a textile printing apparatus, or the like.

In addition, in the embodiment, a liquid ejecting apparatus that uses a piezo method in which a drive circuit drives a piezoelectric element (capacitive load) as a drive element is described as an example, but the invention can also be applied to a liquid ejecting apparatus in which a drive circuit drives a drive element that does not have a capacitive load. As such a liquid ejecting apparatus, for example, there is a liquid ejecting apparatus that uses a thermal method (bubble method) in which a drive circuit drives a heating element (for example, resistance) as a drive element and that ejects liquid by using bubbles that occur due to heating of the heating element, or the like.

Figure 1:
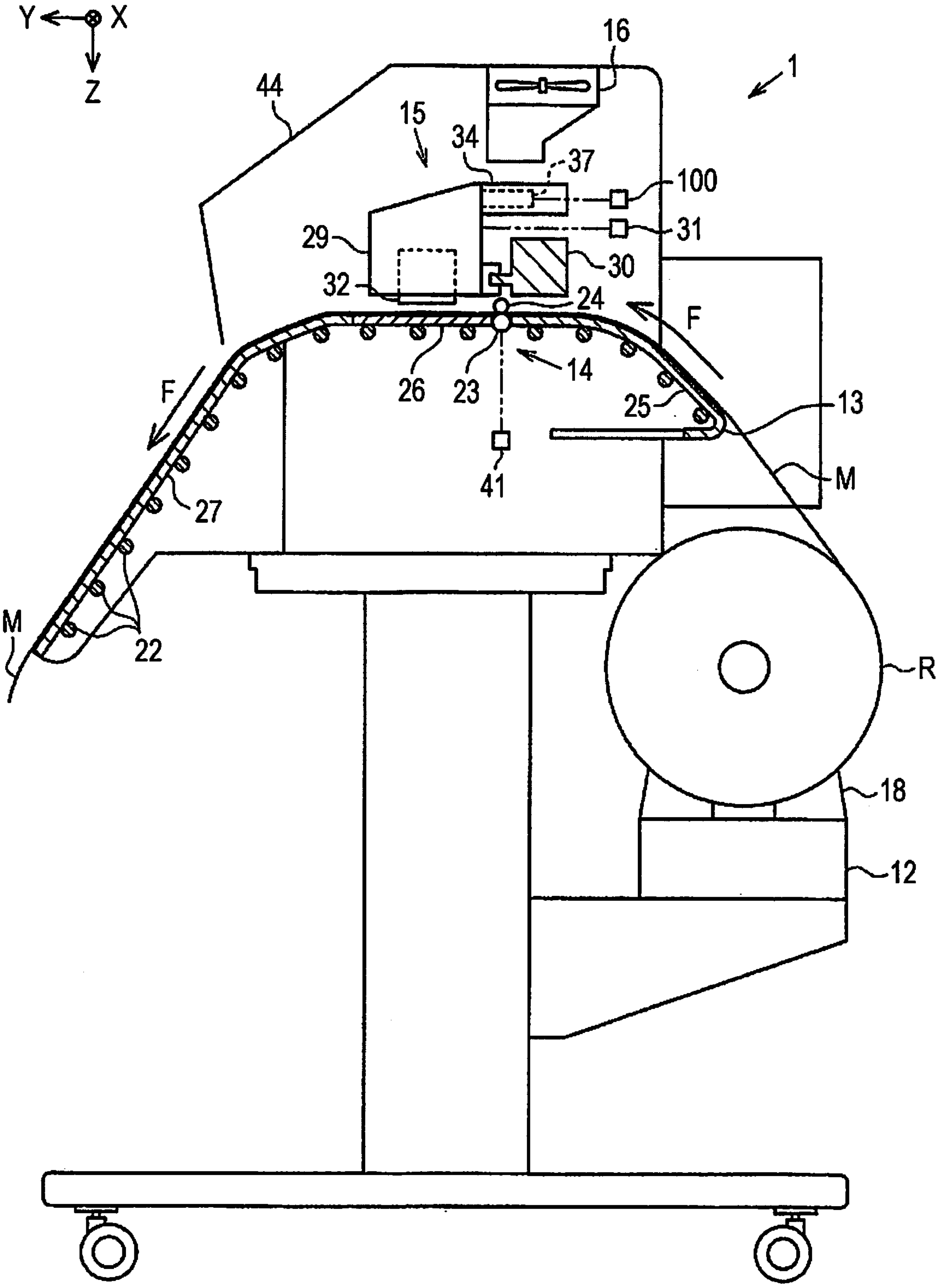
FIG. 1 is a schematic side view illustrating a configuration of a liquid ejecting apparatus.

As illustrated in FIG. 1, a liquid ejecting apparatus 1 includes a delivery section 12 that delivers a medium M, a supporting section 13 that supports the medium M, a transport section 14 that transports the medium M, a printing section 15 that performs printing on the medium M, a blower section 16 that blows air toward the printing section 15, and a control section 100 that controls the configurations of the above-described sections.

In the following description, a width direction of the liquid ejecting apparatus 1 (depth direction in FIG. 1) is denoted as "scanning direction X", and a depth direction of the liquid ejecting apparatus 1 (width direction in FIG. 1) is denoted as "front/rear direction Y", a height direction of the liquid ejecting apparatus 1 (height direction in FIG. 1) is denoted as "vertical direction Z", and a direction in which the medium M is transported is denoted as "transport direction F". The scanning direction X, the front/rear direction Y, and the vertical direction Z cross each other, and the transport direction F intersects the scanning direction X.

The delivery section 12 includes a holding unit member 18 that rotatably holds a roll body R on which the medium M is rolled up. The holding unit member 18 holds a different type of a medium M and a roll body having a different size in the scanning direction X. In addition, in the delivery section 12, the medium M unwound from the roll body R is delivered to the supporting section 13 when the roll body R is rotated in a specific direction (counterclockwise direction in FIG. 1).

The supporting section 13 includes a first supporting section 25, a second supporting section 26, and a third supporting section 27 that constitute a transport path for the medium M in the transport direction F in this order from the roll body R. The first supporting section 25 guides the medium M that has been delivered from the delivery section 12 to the second supporting section 26, the second supporting section 26 supports the medium on which the printing is to be performed, and the third supporting section 27 guides the printed medium M downstream in the transport direction F.

On the opposite side of the transport path for the medium M in the first supporting section 25, the second supporting section 26, and the third supporting section 27, heating sections 22 are provided to heat the first supporting section 25, the second supporting section 26, and the third supporting section 27. The heating sections 22 indirectly heat the medium M supported by the first supporting section 25, the second supporting section 26, and the third supporting section 27 by heating the first supporting section 25, the second supporting section 26, and the third supporting section 27. The heating section 22 is constituted, for example, by a heating wire (heater wire) or the like.

The transport section 14 includes a transport roller 23 that applies a transport force to the medium M, a following roller 24 that holds the medium M against the transport roller 23, and a transport motor 41 that drives the transport roller 23. The transport roller 23 and the following roller 24 are rollers, and the axial direction of each corresponds to the scanning direction X.

The transport roller 23 is disposed vertically below the transport path for the medium M, and the following roller 24 is disposed vertically above the transport path for the medium M. The transport motor 41 is constituted, for example, by a motor, a decelerator, and the like. In addition, in the transport section 14, when the transport roller 23 is rotated in a state in which the medium M is pinched by the transport roller 23 and the following roller 24, the medium M is transported in the transport direction F.

Figure 2:
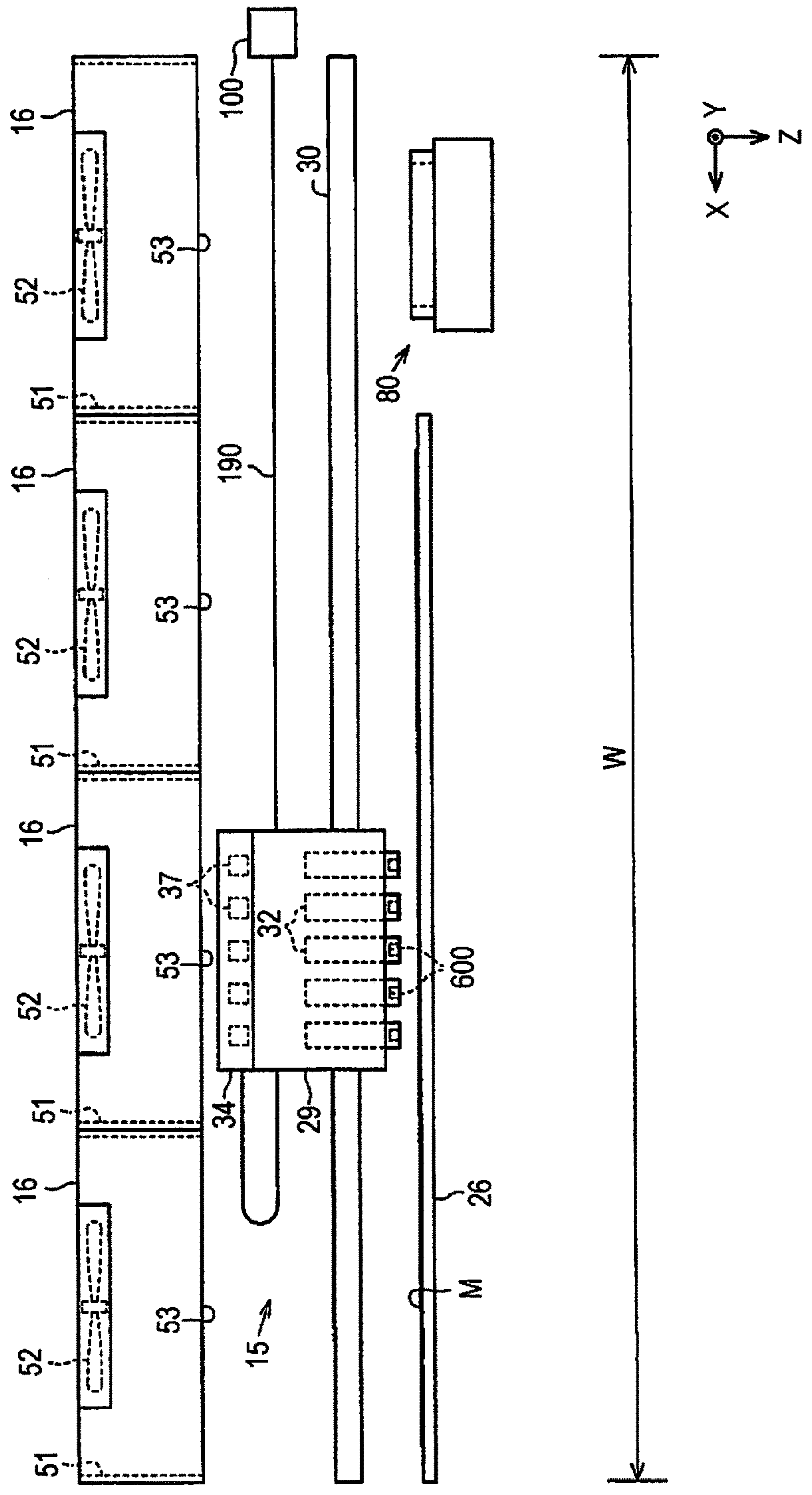
FIG. 2 is a front view illustrating an internal configuration of the liquid ejecting apparatus.

As illustrated in FIGS. 1 and 2, the printing section 15 includes a guide member 30 that extends in the scanning direction X, a carriage 29 supported by the guide member 30 so as to be movable in the scanning direction X, two or more (five in the embodiment) head units 32, each of which is supported by the carriage 29 and ejects ink onto the medium M, and a carriage motor 31 that moves the carriage 29 in the scanning direction X.

In addition, the printing section 15 includes two or more (five in the embodiment) drive circuit units 37 that are supported by the carriage 29 and drive the two or more respective head units 32, a heat dissipation case 34 that accommodates the drive circuit units 37, and a maintenance unit 80 that performs maintenance of the head units 32.

The drive circuit units 37 are electrically connected to the control section 100 through a flexible flat cable 190.

At the bottom of the carriage 29, the two or more head units 32 are supported in a state of being arrayed at equal intervals in the scanning direction X, and the lower end of each of the head units 32 protrudes to the outside from the bottom surface of the carriage 29. On the bottom surface of each of the head units 32, two or more ejecting sections 600, each of which ejects ink, are opened in a state of being arrayed in the front/rear direction Y. Details of the printing section 15 and the carriage 29 are described later.

The maintenance unit 80 is provided so as to be adjacent to the second supporting section 26 in the scanning direction X. The maintenance unit 80 executes maintenance processing for recovering a normal ink ejecting state in the ejecting section 600.

The blower section 16 includes a duct 51 that enables communication between the inside and the outside of a housing 44 and a blower fan 52 provided in the duct 51. The duct 51 includes an air outlet 53 opened toward a moving region W of the carriage 29. The air outlet 53 of the duct 51 is disposed in the vertical direction Z so as to overlap with the heat dissipation case 34 disposed in the carriage 29.

The two or more blower sections 16 are provided vertically above the moving region W of the carriage 29 along the moving region W (in the scanning direction X). Thus, the blower sections 16 can send air toward the whole moving region W of the carriage 29. That is, the blower sections 16 are disposed along the movement path of the carriage 29 and function as an air flow generation section that indirectly cools the drive circuit units 37 in the heat dissipation case 34 by sending air toward the heat dissipation case 34.

1-2. Electrical Configuration of Liquid Ejecting Apparatus

Figure 3:
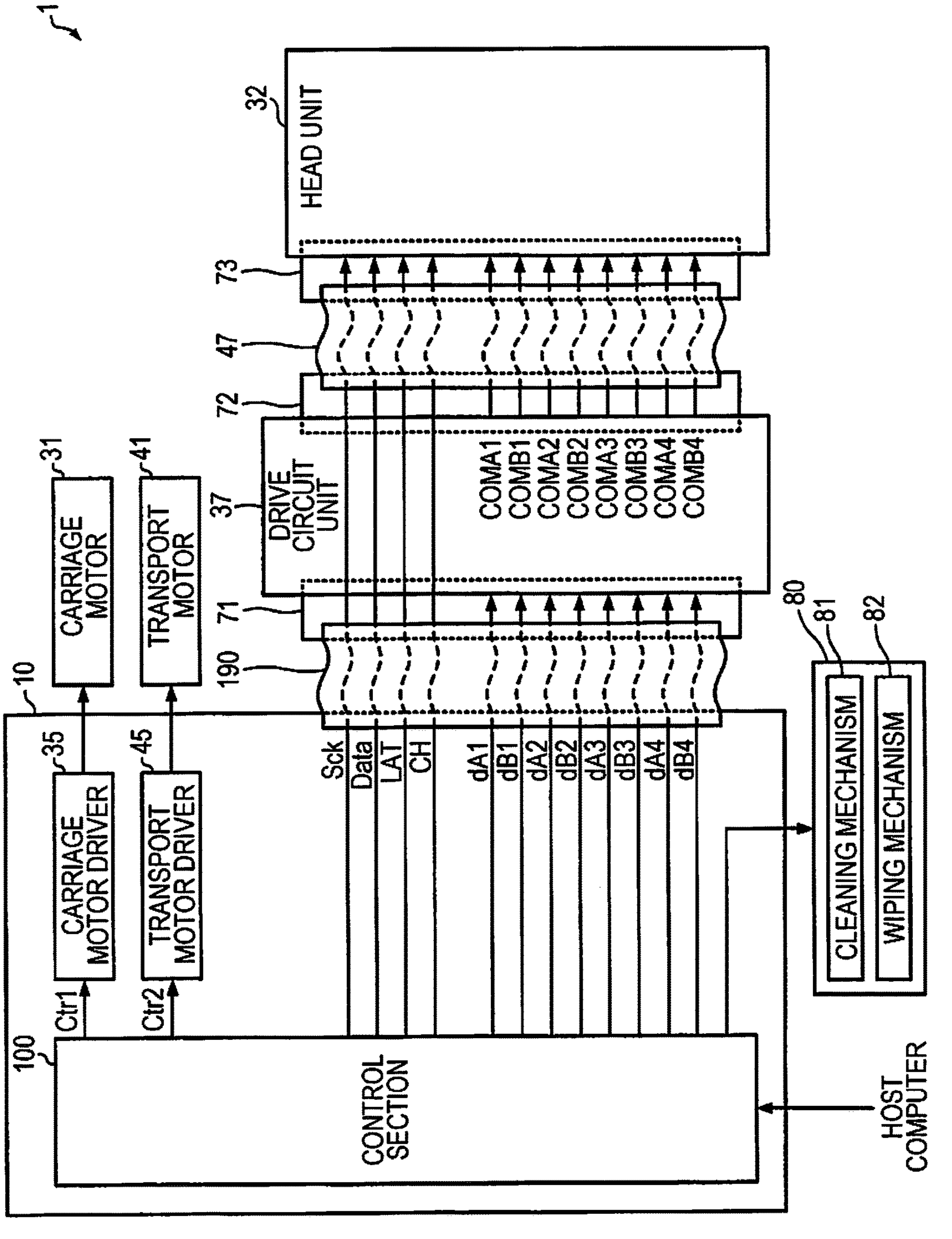
FIG. 3 is a block diagram illustrating an electrical configuration of the liquid ejecting apparatus.
Figure 4:
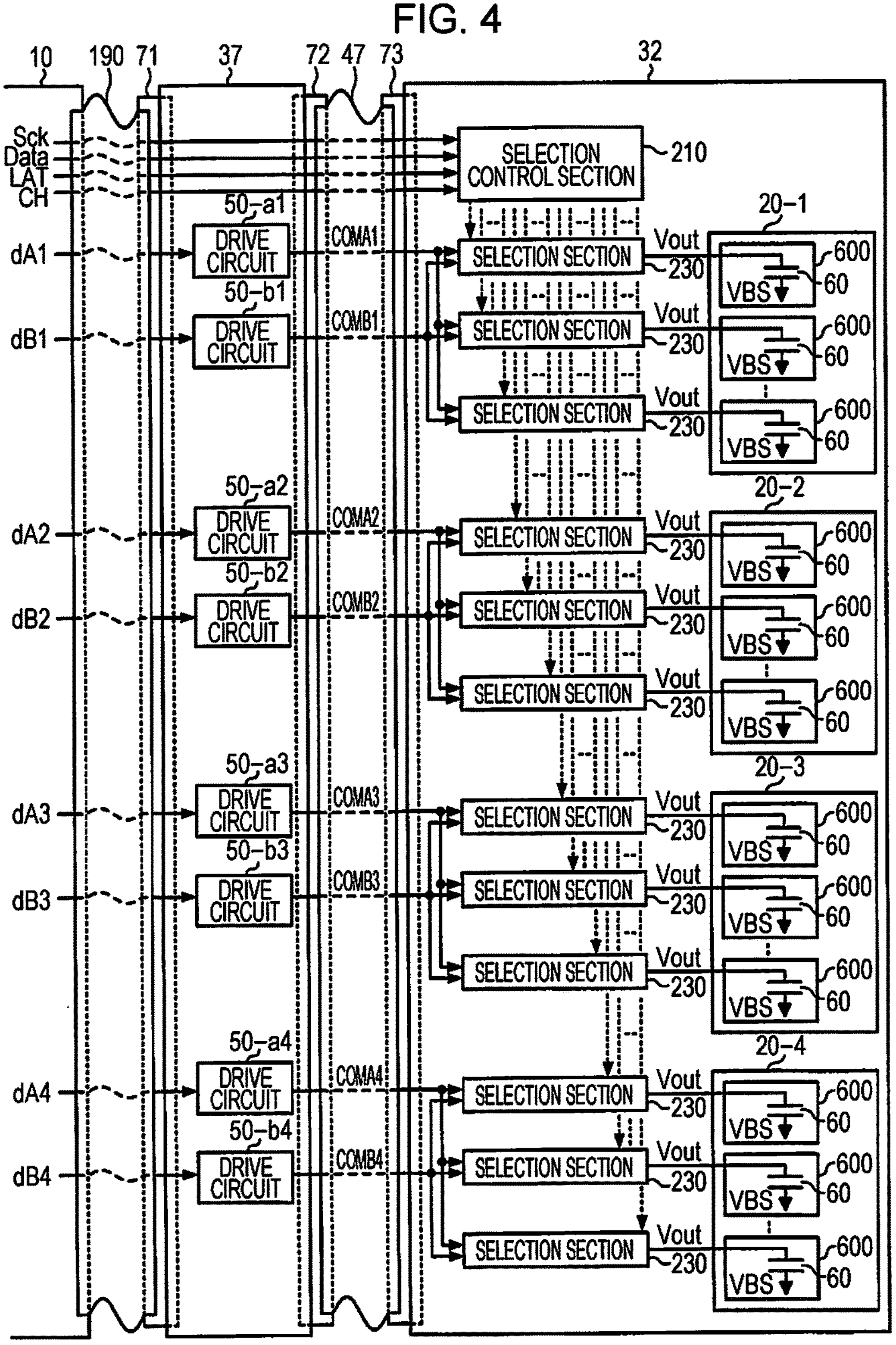
FIG. 4 is a block diagram illustrating an electrical configuration of the liquid ejecting apparatus.

FIGS. 3 and 4 are block diagrams each illustrating an electrical configuration of the liquid ejecting apparatus 1.

As illustrated in FIG. 3, in the liquid ejecting apparatus 1, a control unit 10 and the drive circuit unit 37 are connected to each other with the flexible flat cable 190 and a drive circuit input connector 71, and the drive circuit unit 37 and a head unit 32 are connected to each other with a drive circuit output connector 72, a connection cable 47, and a head unit input connector 73.

The control unit 10 includes a control section 100, a carriage motor driver 35, and a transport motor driver 45. The control section 100 performs output of various control signals and the like used to control sections in the liquid ejecting apparatus 1 when image data is supplied to the control section 100 from a host computer.

Specifically, the control section 100 determines the scanning location (current location) of the carriage 29. In addition, the control section 100 supplies a control signal Ctr1 to the carriage motor driver 35 in accordance with the scanning location of the carriage 29. The carriage motor driver 35 drives the carriage motor 31 in accordance with the control signal Ctr1. As a result, the movement of the carriage 29 in the scanning direction X is controlled.

In addition, the control section 100 supplies a control signal Ctr2 to the transport motor driver 45. The transport motor driver 45 drives the transport motor 41 in accordance with the control signal Ctr2. As a result, the movement of the medium M in the transport direction F is controlled.

In addition, the control section 100 supplies a clock signal Sck, a data signal Data, control signals LAT and CH, and digital data dA1, dB1, dA2, dB2, dA3, dB3, dA4, and dB4 to the drive circuit unit 37 via the flexible flat cable 190.

In addition, the control section 100 causes the maintenance unit 80 to execute maintenance processing for recovering the normal ink ejecting state in the ejecting section 600. As the maintenance processing, the maintenance unit 80 may include a cleaning mechanism 81 used to execute cleaning processing (pumping processing) in which thickened ink, bubbles, and the like in the ejecting section 600 are aspirated by a tube pump (not illustrated). In addition, as the maintenance processing, the maintenance unit 80 may include a wiping mechanism 82 used to execute wiping processing in which foreign matter such as paper powder adhering near to the nozzle of the ejecting section 600 is wiped by a wiper member.

In the embodiment, as described above, the five drive circuit units 37 and the respective five head units 32 are provided in the carriage 29. All the drive circuit units 37 have similar configurations, and all the five head units 32 have similar configurations, and therefore, in FIGS. 3 and 4, a single drive circuit unit 37 and a single head unit 32 are representatively described, and illustrations and descriptions of the remaining drive circuit units 37 and head units 32 are omitted herein.

FIG. 4 is a block diagram illustrating electrical configurations of the drive circuit unit 37 and the head unit 32. The drive circuit unit 37 is configured so as to include drive circuits 50-a1, 50-b1, 50-a2, 50-b2, 50-a3, 50-b3, 50-a4, and 50-b4.

Details of the drive circuits are described later. The drive circuits 50-a1 and 50-b1 generate the respective drive signals COMA1 and COMB1 that drive two or more ejecting sections 600 included in a head 20-1 provided in the head unit 32 and cause ink (liquid) to be ejected. Specifically, the drive circuit 50-a1 generates the drive signal COMA1 which has been subjected to class D amplification and supplies the generated drive signal COMA1 to the head 20-1 after having performed analog conversion of the data dA1. Similarly, the drive circuit 50-b1 generates the drive signal COMB1 which has been subjected to class D amplification and supplies the generated drive signal COMB1 to the head 20-1 after having performed analog conversion of the data dB1.

In addition, the drive circuits 50-a2 and 50-b2 generate the respective drive signals COMA2 and COMB2 that drive two or more ejecting sections 600 included in a head 20-2 provided in the head unit 32 and cause ink (liquid) to be ejected. Specifically, the drive circuit 50-a2 generates the drive signal COMA2 which has been subjected to class D amplification and supplies the generated drive signal COMA2 to the head 20-2 after having performed analog conversion of the data dA2. Similarly, the drive circuit 50-b2 generates the drive signal COMB2 which has been subjected to class D amplification and supplies the generated drive signal COMB2 to the head 20-2 after having performed analog conversion of the data dB2.

In addition, the drive circuit 50-a3 and 50-b3 generate the respective drive signals COMA3 and COMB3 that drive two or more ejecting sections 600 included in a head 20-3 provided in the head unit 32 and cause ink (liquid) to be ejected. Specifically, the drive circuit 50-a3 generates the drive signal COMA3 which has been subjected to class D amplification and supplies the generated drive signal COMA3 to the head 20-3 after having performed analog conversion of the data dA3. Similarly, the drive circuit 50-b3 generates the drive signal COMB3 which has been subjected to class D amplification and supplies the generated drive signal COMB3 to the head 20-3 after having performed analog conversion of the data dB3.

In addition, the drive circuits 50-a4 and 50-b4 generate the respective that drive signals COMA4 and COMB4 that drive two or more ejecting sections 600 included in a head 20-4 provided in the head unit 32 and cause ink (liquid) to be ejected. Specifically, the drive circuit 50-a4 generates the drive signal COMA4 which has been subjected to class D amplification and supplies the generated drive signal COMA4 to the head 20-4 after having performed analog conversion of the data dA4. Similarly, the drive circuit 50-b4 generates the drive signal COMB4 which has been subjected to class D amplification and supplies the generated drive signal COMB4 to the head 20-4 after having performed analog conversion of the data dB4.

Here, the data dA1, dA2, dA3, and dA4 respectively define waveforms of the drive signals COMA1, COMA2, COMA3, and COMA4 from among the drive signals supplied to the head unit 32. In addition, the data dB1, dB2, dB3, dB4 respectively define waveforms of the drive signals COMB1, COMB2, COMB3, COMB4 from among the drive signals supplied to the head unit 32.

That is, in the embodiment, in the drive circuit unit 37, in accordance with the four pairs of the data dA1 and dB1, the data dA2 and dB2, the data dA3 and dB3, and the data dA4 and dB4, the four pairs of the drive circuits 50-a1 and 50-b1, the drive circuits 50-a2 and 50-b2, the drive circuits 50-a3 and 50-b3, and the drive circuits 50-a4 and 50-b4 perform output of the drive signals COMA1 and COMB1, the drive signals COMA2 and COMB2, the drive signals COMA3 and COMB3, and the drive signals COMA4 and COMB4 and drive the heads 20-1, 20-2, 20-3, and 20-4, respectively.

When the drive signals COMA1, COMA2, COMA3, and COMA4 need not be particularly distinguished (for example, in a case in which a subsequent description is made later with reference to FIGS. 5, 11, and 12), the number of each reference symbol is omitted, and the drive signal is simply referred to as "drive signal COMA", and when the drive signals COMB1, COMB2, COMB3, and COMB4 need not to be particularly distinguished (for example, in a case in which a subsequent description is made later with reference to FIGS. 5, 11, and 12), the number of each reference symbol is omitted, and the drive signal is simply referred to as "drive signal COMB".

In addition, as described later, the drive circuits 50-a1, 50-b1, 50-a2, 50-b2, 50-a3, 50-b3, 50-a4, and 50-b4 have the same circuit configuration except for different input data and different waveforms of output drive signals. Therefore, when the drive circuits 50-a1, 50-b1, 50-a2, 50-b2, 50-a3, 50-b3, 50-a4, and 50-b4 need not be particularly distinguished (for example, in a case in which a subsequent description is made later with reference to FIG. 5), "-" and the corresponding character are omitted, and the drive circuit is simply referred to as "drive circuit 50".

In addition, similarly, when the heads 20-1, the head 20-2, the head 20-3, and the head 20-4 need not be particularly distinguished (for example, in a case in which a subsequent description is made later with reference to FIG. 9), "-" and the corresponding character are omitted, and the head is simply referred to as "head 20".

The head unit 32 is configured so as to include a selection control section 210, two or more selection units 230, and two or more heads 20.

The selection control section 210 instructs each of the selection units 230 to determine which of the drive signals COMA and COMB is to be or not to be selected in accordance with the clock signal Sck, the data signal Data, and the control signals LAT and CH, which have been supplied from the control section 100.

Each of the selection units 230 selects the drive signal COMA or COMB in accordance with the instruction from the selection control section 210 and supplies the selected drive signal to a corresponding piezoelectric element 60 included in the head 20. In FIG. 4, a voltage of such a drive signal is referred to as a drive voltage Vout. In addition, a reference voltage VBS is applied to the other ends of the piezoelectric elements 60 in common.

In addition, as described later, the piezoelectric element 60 is displaced when the drive signal COMA or COMB is applied to the piezoelectric element 60. The piezoelectric elements 60 are provided so as to correspond to the two or more respective ejecting sections 600 in the head 20. In addition, the piezoelectric element 60 ejects ink by being displaced in accordance with a difference between the drive voltage Vout that has been selected by the selection unit 230 and the reference voltage VBS.

1-3. Electrical Configuration of Drive Circuit

Figure 5:
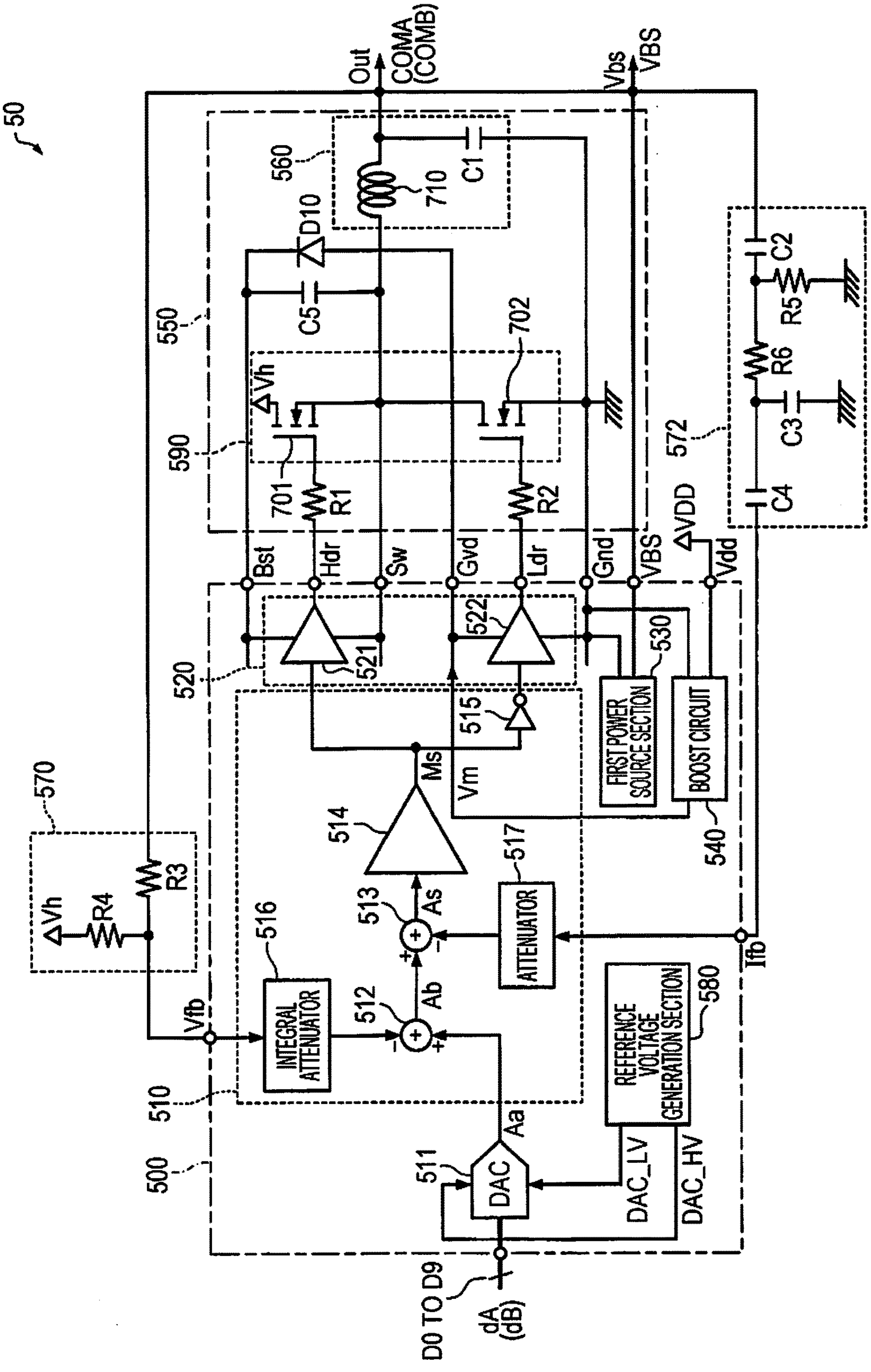
FIG. 5 is a diagram illustrating a circuit configuration of a drive circuit.

FIG. 5 is a diagram illustrating a circuit configuration of the drive circuit 50. In FIG. 5, a configuration in which output of the drive signal COMA is performed is illustrated representatively, but a configuration in which output of the drive signal COMB is performed is also similar to that of the drive signal COMA.

As illustrated in FIG. 5, the drive circuit 50 is constituted by an integrated circuit apparatus 500, an output circuit 550, and various elements such as resistors, and capacitors.

The integrated circuit apparatus 500 according to the embodiment includes a modulation section 510 and a gate driver 520.

The integrated circuit apparatus 500 outputs gate signals (amplification control signals) to a high-side transistor 701 and a low-side transistor 702 in accordance with the data dA or dB, respectively, (example of "first source signal" or "second source signal") of 10 bits, which have been input through respective terminals D0 to D9 from the control section 100. Therefore, the integrated circuit apparatus 500 includes a digital-to-analog converter (DAC) 511, an adder 512, an adder 513, a comparator 514, an integral attenuator 516, an attenuator 517, an inverter 515, a high-side gate driver 521, a low-side gate driver 522, a first power source section 530, a boost circuit 540, and a reference voltage generation section 580.

The reference voltage generation section 580 generates a first reference voltage DAC_HV (high voltage side reference voltage) and a second reference voltage DAC_LV (low voltage side reference voltage) and supplies the generated voltages to the DAC 511.

The DAC 511 converts the data dA that defines the waveform of the drive signal COMA into a source drive signal Aa of a voltage between the first reference voltage DAC_HV and the second reference voltage DAC_LV and supplies the converted signal to the input end (+) of the adder 512. The maximum value and the minimum value of the voltage amplitude of the source drive signal Aa are respectively determined by the first reference voltage DAC_HV and the second reference voltage DAC_LV (for example, about 1 V to 2 V), and the drive signal COMA is obtained by amplifying such a voltage Aa. That is, the source drive signal Aa is a signal that is a target before amplification of the drive signal COMA.

In the embodiment, the modulation section 510 (example of "first modulation circuit" or "second modulation circuit") generates a modulation signal Ms (example of "first modulation signal" or "second modulation signal") obtained by pulse-modulating the input data dA.

The modulation section 510 is configured so as to include the adders 512 and 513, the comparator 514, the inverter 515, the integral attenuator 516, and the attenuator 517.

The integral attenuator 516 attenuates and integrates a terminal Out voltage, which has been input through a terminal Vfb, that is, the drive signal COMA, and supplies the obtained voltage to the input end (−) of the adder 512.

The adder 512 supplies, to the input end (+) of the adder 513, a signal Ab of a voltage which is obtained by subtracting the voltage of the input end (−) from the voltage of the input end (+) of the adder 512 and performing integration on the voltage.

A power source voltage of the circuit that ranges from the DAC 511 to the inverter 515 has a low-amplitude voltage of 3.3 V (power source voltage VDD supplied from a power source terminal Vdd). Therefore, the voltage of the source drive signal Aa is at most about 2 V, but the voltage of the drive signal COMA may exceed 40 V, and therefore, in order to relate the amplitude ranges of both the voltages to each other to obtain the deviation, the voltage of the drive signal COMA is attenuated by the integral attenuator 516.

The attenuator 517 attenuates a high-frequency component of the drive signal COMA that has been input through a terminal Ifb and supplies the attenuated frequency component to the input end (−) of the adder 513. The adder 513 supplies, to the comparator 514, a signal As of a voltage obtained by subtracting the voltage of the input end (−) from the voltage of the input end (+) of the adder 513. A function of the attenuator 517 is to adjust modulation gain (sensitivity). That is, a duty ratio and a frequency of the modulation signal Ms are changed in accordance with the data dA (source signal), but the attenuator 517 adjusts such change amounts.

The voltage of the signal As output from the adder 513 is a voltage obtained by subtracting the attenuation voltage of the signal that has been supplied to the terminal Vfb from the voltage of the source drive signal Aa and subtracting the attenuation voltage of the signal that has been supplied to the terminal Ifb from the obtained voltage. Therefore, the voltage of the signal As determined by the adder 513 can be a signal obtained by correcting, by the high-frequency component of the drive signal COMA the deviation obtained by subtracting the attenuation voltage of the drive signal COMA output from the terminal Out from the voltage of the source drive signal Aa, which is a target.

The comparator 514 performs output of the modulation signal Ms that has been pulse-modulated as described below, in accordance with the subtraction voltage by the adder 513. Specifically, the comparator 514 performs output of the modulation signal Ms that reaches an H level when the signal As output from the adder 513 is a voltage threshold value Vth1 or more when the voltage increases and reaches an L level when the signal As falls below a voltage threshold value Vth2 when the signal As decreases. As described later, the voltage threshold values are set such that "Vth1>Vth2" is satisfied.

The modulation signal Ms by the comparator 514 is supplied to the low-side gate driver 522 after logic inversion by the inverter 515. In addition, to the high-side gate driver 521, the modulation signal Ms is supplied without logic inversion. Therefore, the logical levels respectively supplied to the high-side gate driver 521 and the low-side gate driver 522 are mutually exclusive.

Timing control may be performed such that the logical levels respectively supplied to the high-side gate driver 521 and the low-side gate driver 522 are not at H level at the same time (the high-side transistor 701 and the low-side transistor 702 are not switched on at the same time). Therefore, here, "exclusive" means that, strictly speaking, the logical levels are not at the H level at the same time (the high-side transistor 701 and the low-side transistor 702 are not switched on at the same time).

Here, a "modulation signal" is the modulation signal Ms in a narrow sense, but, as long as the modulation signal is pulse-modulated in accordance with the source drive signal Aa, the negative signal of the modulation signal Ms is also included in the "modulation signal". That is, the modulation signal that has been pulse-modulated in accordance with the source drive signal Aa includes a modulation signal that has been obtained by inverting the logical level of the modulation signal Ms and a modulation signal on which timing control has been performed, in addition to the modulation signal Ms.

The comparator 514 performs output of the modulation signal Ms, such that the circuit that ranges up to the comparator 514 or the inverter 515, that is, the adder 512, the adder 513, the comparator 514, the inverter 515, the integral attenuator 516, and the attenuator 517 correspond to the modulation section 510 that generates a modulation signal.

An amplification section 590 (examples of "first amplification section" or "second amplification section") includes the high-side transistor 701 (example of "first transistor" or "second transistor") and the low-side transistor 702 (example of "third transistor" or "fourth transistor"), and amplifies the modulation signals Ms to generate amplification modulation signals (example of "first amplification modulation signal" or "second amplification modulation signal").

The high-side transistor 701 and the low-side transistor 702 are respectively driven in accordance with amplification control signals output from the high-side gate driver 521 and the low-side gate driver 522 included in the integrated circuit apparatus 500.

The high-side gate driver 521 level-shifts a low logic amplitude of the output signal of the comparator 514 to a high logic amplitude, and outputs the signal from a terminal Hdr. From among power source voltages of the high-side gate driver 521, the high-level side corresponds to a voltage applied through a terminal Bst, and the low-level side corresponds to a voltage applied to through a terminal Sw. The terminal Bst is connected to one end of the capacitance element C5 and a cathode electrode of a backflow prevention diode D10. The terminal Sw is connected to a source electrode of the high-side transistor 701, a drain electrode of the low-side transistor 702, the other end of the capacitance element C5, and one end of an inductor 710. An anode electrode of the diode D10 is connected to one end of a terminal Gvd, and a voltage Vm (for example, 7.5 V) output from the boost circuit 540 is applied to the anode electrode of the diode D10. Thus, a potential difference between the terminal Bst and the terminal Sw is approximately equal to a potential difference between both ends of the capacitance element C5, that is, the voltage Vm (for example, 7.5 V).

The low-side gate driver 522 operates on the lower potential side than the high-side gate driver 521. The low-side gate driver 522 level-shifts a low logic amplitude (L level: 0 V, H level: 3.3 V) of the output signal of the inverter 515 to a high logic amplitude (for example, L level: 0 V, H level: 7.5 V), and outputs the signal from the terminal Ldr. From among power source voltages of the low-side gate driver 522, as the high-level side, application of the voltage Vm (for example, 7.5 V) is performed, and as a low-level side, application of a voltage zero is performed through a ground terminal Gnd, that is, the ground terminal Gnd is connected to the ground terminal Gnd. In addition, the terminal Gvd is connected to the anode electrode of the diode D10.

The high-side transistor 701 and the low-side transistor 702 are, for example, N-channel type field effect transistors (FET). From among the transistors, in the high-side transistor 701, a voltage Vh (for example, 42 V) is applied to the drain electrode, and the gate electrode is connected to the terminal Hdr through a resistance R1. In the low-side transistor 702, the gate electrode is connected to the terminal Ldr through a resistance R2, and the source electrode is grounded.

Thus, when the high-side transistor 701 is switched off, and the low-side transistor 702 is switched on, the voltage of the terminal Sw becomes 0 V, and the voltage Vm (for example, 7.5 V) is applied to the terminal Bst. In addition, when the high-side transistor 701 is switched on, and the low-side transistor 702 is switched off, the voltage Vh (for example, 42 V) is applied to the terminal Sw, and a voltage Vh+Vm (for example, 49.5 V) is applied to the terminal Bst.

That is, the high-side gate driver 521 performs output of an amplification control signal having the L level at around 0 V and the H level at around the voltage Vm (for example, 7.5 V), or an amplification control signal having the L level at around the voltage Vh (for example, 42 V) and the H level at around the voltage Vh+Vm (for example, 49.5 V) because a reference potential (potential of the terminal Sw) is changed to 0 V or Vh (for example, 42V), in accordance with operations of the high-side transistor 701 and the low-side transistor 702 by using the capacitance element C5 as a floating power source. In addition, the low-side gate driver 522 performs output of an amplification control signal having the L level at around 0 V and the H level at around Vm (for example, 7.5 V) because the reference potential (potential of the ground terminal Gnd) is fixed at 0 V regardless of the operations of the high-side transistor 701 and the low-side transistor 702.

The high-side transistor 701 and the low-side transistor 702 are respectively driven in accordance with the amplification control signals that have been output from the high-side gate driver 521 and the low-side gate driver 522 to perform output of the amplification modulation signal that has been obtained by amplifying the modulation signal Ms. That is, the high-side transistor 701 and the low-side transistor 702 correspond to the amplification section 590.

A low pass filter (LPF) 560 (example of "first demodulation circuit" or "second demodulation circuit") demodulates the amplification modulation signal (example of "first amplification modulation signal" or "second amplification modulation signal"), and generates a drive signal COMA (or COMB) (example of "first drive signal" or "second drive signal").

The LPF 560 is configured so as to include the inductor 710 and a capacitance element C1.

As described above, the one end of the inductor 710 is connected to the terminal Sw, the source electrode in the high-side transistor 701, the drain electrode in the low-side transistor 702, and the other end of the capacitance element C5, and a modulation amplification signal is input to the one end of the inductor 710.

The other end of the inductor 710 is the terminal Out corresponding to an output of the drive circuit 50, and the drive signal COMA (or COMB) is supplied to a corresponding selection unit 230 from the terminal Out.

The terminal Out is connected to the one end of the capacitance element C1, one end of a capacitance element C2, and one end of a resistance R3. From among the capacitance elements, the other end of the capacitance element C1 is grounded. Therefore, the inductor 710 and the capacitance element C1 function as a LPF that smoothes and demodulates an amplification modulation signal that appears at a connection point between the high-side transistor 701 and the low-side transistor 702.

The other end of the resistance R3 is connected to the terminal Vfb and one end of a resistance R4, and the voltage Vh is applied to the other end of the resistance R4. As a result, the drive signal COMA that has passed through a first feedback circuit 570 (circuit constituted by the resistance R3 and the resistance R4) is pulled up and fed back to the terminal Vfb from the terminal Out.

In addition, the other end of the capacitance element C2 is connected to one end of a resistance R5 and one end of a resistance R6. From among the resistances, the other end of the resistance R5 is grounded. Therefore, the capacitance element C2 and the resistance R5 function as a high pass filter (HPF) through which a high-frequency component of the drive signal COMA from the terminal Out, which is a cut-off frequency or more, is caused to pass. The cut-off frequency of the HPF is set, for example, at about 9 MHz.

In addition, the other end of the resistance R6 is connected to one end of a capacitance element C4 and one end of a capacitance element C3. From among the capacitance elements, the other end of the capacitance element C3 is grounded. Therefore, the resistance R6 and the capacitance element C3 function as an LPF through which a low-frequency component of the signal component that has passed through the above-described HPF, which is the cut-off frequency or less, is caused to pass. The cut-off frequency of the LPF is set, for example, at about 160 MHz.

The above-described cut-off frequency of the HPF is set at lower than the cut-off frequency of the above-described LPF, such that the HPF and the LPF function as a band pass filter (BPF) through which a high-frequency component of a specific frequency range in the drive signal COMA is caused to pass.

The other end of the capacitance element C4 is connected to the terminal Ifb of the integrated circuit apparatus 500. As a result, a DC component is cut from the high-frequency component of the drive signal COMA that has passed through a second feedback circuit 572 (circuit constituted by the capacitance element C2, the resistance R5, the resistance R6, the capacitance element C3, and the capacitance element C4) that functions as the above-described BPF, and fed back to the terminal Ifb.

The drive signal COMA output from the terminal Out is a signal that has been obtained by smoothing the amplification modulation signal at the connection point (terminal Sw) between the high-side transistor 701 and the low-side transistor 702 by the LPF 560 constituted by the inductor 710 and the capacitance element C1. Integration and subtraction are performed on the drive signal COMA through the terminal Vfb, and the drive signal COMA is fed back to the adder 512, such that self-excited oscillation occurs in the drive signal COMA with a frequency defined by a delay of the feedback (sum of a delay due to smoothing of the inductor 710 and the capacitance element C1 and a delay due to the integral attenuator 516), and a transfer function of the feedback.

However, a delay amount of the feedback path through the terminal Vfb is large, and therefore, there is a case in which the self-excited oscillation frequency cannot increases sufficiently to obtain high enough accuracy of the drive signal COMA only by the feedback through the terminal Vfb.

Therefore, in the embodiment, a path through which a high-frequency component of the drive signal COMA is fed back via the terminal Ifb is provided in addition to the path that passes through the terminal Vfb, and therefore, a delay for the whole circuit is reduced. Therefore, a frequency of the signal As that has been obtained by adding the high-frequency component of the drive signal COMA to the signal Ab increases sufficiently to obtain high accuracy of the drive signal COMA, compared with a case in which there is no path that passes through the terminal Ifb.

Figure 6:
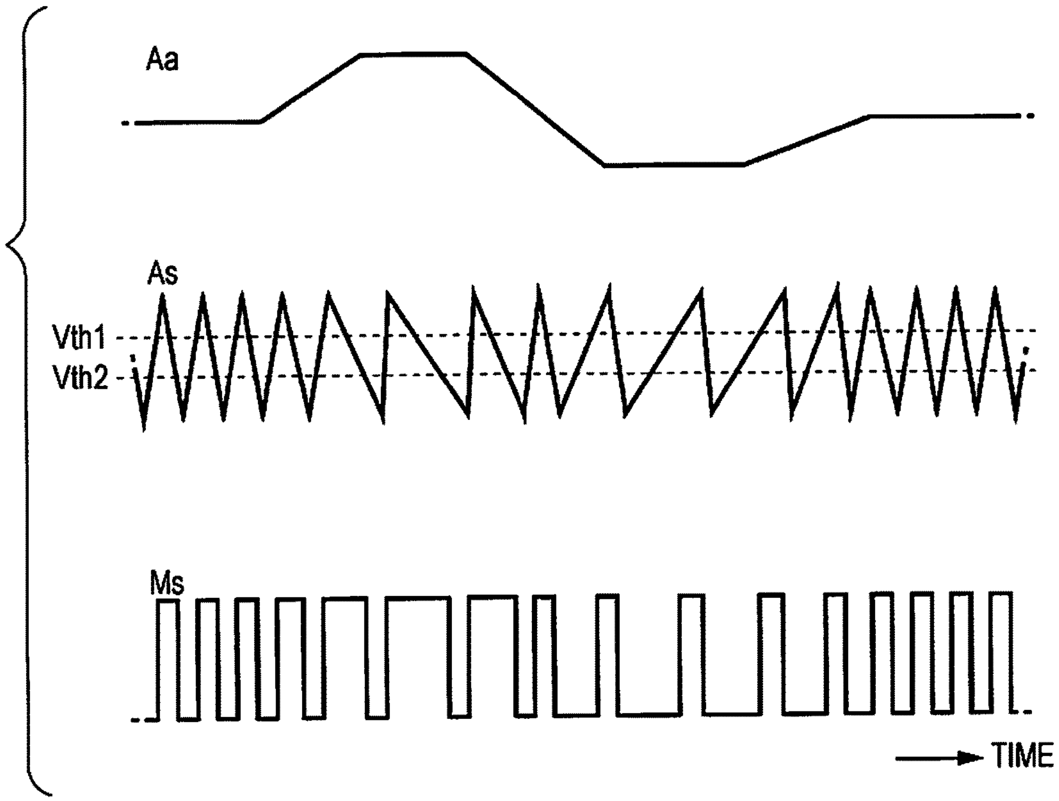
FIG. 6 is a diagram illustrating an operation of the drive circuit.

FIG. 6 is a diagram illustrating association of waveforms of the signal As and the modulation signal Ms with a waveform of the source drive signal Aa.

As illustrated in FIG. 6, the signal As has a triangular wave, and the oscillation frequency fluctuate depending on a voltage (input voltage) of the source drive signal Aa. Specifically, the oscillation frequency becomes the highest when the input voltage has an intermediate value, and becomes lower as the input voltage becomes higher or lower than the intermediate value.

In addition, when a slope of an increase (increase in the voltage) and a slope of a decrease (decrease in the voltage) in the triangular wave of the signal As become almost equal to each other when the input voltage is near the intermediate value. Therefore, a duty ratio of the modulation signal Ms as a result of comparing of the voltage threshold values Vth1 or Vth2 with the signal As by the comparator 514 becomes almost 50%. As the input voltage becomes higher than the intermediate value, the decrease slope of the signal As is loosened. Therefore, a time period in which the modulation signal Ms reaches the H level is relatively increased, and the duty ratio is increased. In addition, as the input voltage becomes lower than the intermediate value, the increase slope of the signal As is loosened. Therefore, a time period in which the modulation signal Ms reaches the H level is relatively reduced, and the duty ratio is reduced.

Therefore, the modulation signal Ms becomes a pulse density modulation signal as described below. That is, the duty ratio of the modulation signal Ms is almost 50% when the input voltage is the intermediate value, and increases as the input voltage becomes higher than the intermediate value and decreases as the input voltage becomes lower than the intermediate value.

The high-side gate driver 521 switches on/off the high-side transistor 701 in accordance with the modulation signal Ms. That is, the high-side gate driver 521 switches on the high-side transistor 701 when the modulation signal Ms is at the H level and switches off the high-side transistor 701 when the modulation signal Ms is at the L level. The low-side gate driver 522 switches on/off the low-side transistor 702 in accordance with the logic inversion signal of the modulation signal Ms. That is, the low-side gate driver 522 switches off the low-side transistor 702 when the modulation signal Ms is at the H level and switches on the low-side transistor 702 when the modulation signal Ms is at the L level.

Thus, the voltage of the drive signal COMA, which has been obtained by smoothing the amplification modulation signal at the connection point between the high-side transistor 701 and the low-side transistor 702 by the inductor 710 and the capacitance element C1, increases as the duty ratio of the modulation signal Ms becomes large and decreases as the duty ratio becomes small, and therefore, the drive signal COMA is controlled so as to become a signal that has been obtained by increasing the voltage of the source drive signal Aa and output of the controlled drive signal COMA is performed.

The drive circuit 50 uses pulse density modulation, and therefore, there is an advantage that a large change width of the duty ratio can be obtained, compared with modulation frequency-fixed pulse width modulation.

That is, the minimum positive pulse width and the minimum negative pulse width, which correspond to the whole circuit, are limited by the circuit characteristics, such that, in the frequency-fixed pulse width modulation, only a specific range (for example, a range from 10% to 90%) is obtained as the change width of the duty ratio. Compared with this, in the pulse density modulation, the oscillation frequency decreases as the input voltage becomes far away from the intermediate value, and therefore, the duty ratio can be further increased in an area in which the input voltage is high, and can be further decreased in an area in which the input voltage is low. Therefore, in self-excited oscillation-type pulse density modulation, as the change width of the duty ratio, a larger range (for example, a range from 5% to 95%) can be obtained.

In addition, the drive circuit 50 is a self-excited oscillation circuit that includes a signal path through which the drive signal COMA, the modulation signal Ms, and an amplification modulation signal are conveyed, and therefore, a circuit is not needed that generates a carrier wave having a high-frequency such as separately-excited oscillation. Therefore, there is an advantage that integration of a portion of the integrated circuit apparatus 500 except for the circuit that deals with a high voltage is easy.

In addition, in the drive circuit 50, as the feedback path of the drive signal COMA, there is a path through which a high-frequency component is fed back via the terminal Ifb in addition to the path that passes through the terminal Vfb, such that a delay for the whole circuit is reduced. Thus, the self-excited oscillation frequency increases, and therefore, the drive circuit 50 can generate the drive signal COMA with high accuracy.

Returning to FIG. 5, in the example illustrated in FIG. 5, the resistances R1 and R2, the amplification section 590, the capacitance element C5, the diode D10, and the LPF 560 constitute as the output circuit 550 that generates an amplification control signal in accordance with a modulation signal, generates a drive signal COMA in accordance with the amplification control signal, and outputs the generated drive signal COMA to the piezoelectric element 60.

The first power source section 530 applies a signal to a terminal different from the terminal of the piezoelectric element 60, to which the drive signal COMA is applied. The first power source section 530 is constituted, for example, by a constant-voltage circuit such as a band gap/reference circuit. The first power source section 530 outputs the reference voltage VBS from a terminal Vbs. In the example illustrated in FIG. 5, the first power source section 530 generates the reference voltage VBS by using a ground potential of the ground terminal Gnd as a reference.

The boost circuit 540 supplies power to the gate driver 520. In the example illustrated in FIG. 5, the boost circuit 540 increases a power source voltage VDD supplied from the power source terminal Vdd by using the ground potential of the ground terminal Gnd as a reference, and generates a voltage Vm, which becomes a high potential side power source voltage of the low-side gate driver 522. The boost circuit 540 can be constituted by a charge pump circuit, a switching regulator, or the like, but occurrence of noise can be suppressed when the boost circuit 540 is constituted by the charge pump circuit, compared with the switching regulator. Therefore, the drive circuit 50 can generate the drive signal COMA with further accuracy and control the voltage applied to the piezoelectric element 60 with high accuracy, and therefore, ejecting accuracy of liquid can be improved. In addition, the size of the power source generation section of the gate driver 520 is reduced so as to be constituted by the charge pump circuit, and therefore, the power source generation section can be mounted on the integrated circuit apparatus 500, and the whole circuit area of the drive circuit 50 can be significantly reduced, compared with a case in which the power source generation section of the gate driver 520 is provided outside the integrated circuit apparatus 500.

In the embodiment, the drive circuit 50 generates a drive signal COMA by the class D amplification. When the drive signal COMA (or COMB) is generated by the class D amplification, power consumption and a calorific value are reduced compared with a case in which the drive signal COMA (or COMB) is generated by the class A/B amplification, and therefore, the number of heat dissipation heat sinks and an area for the heat sinks can be reduced, and as a result, the size and weight of the drive circuit can be reduced.

1-4. Configuration of Carriage

Figure 7:
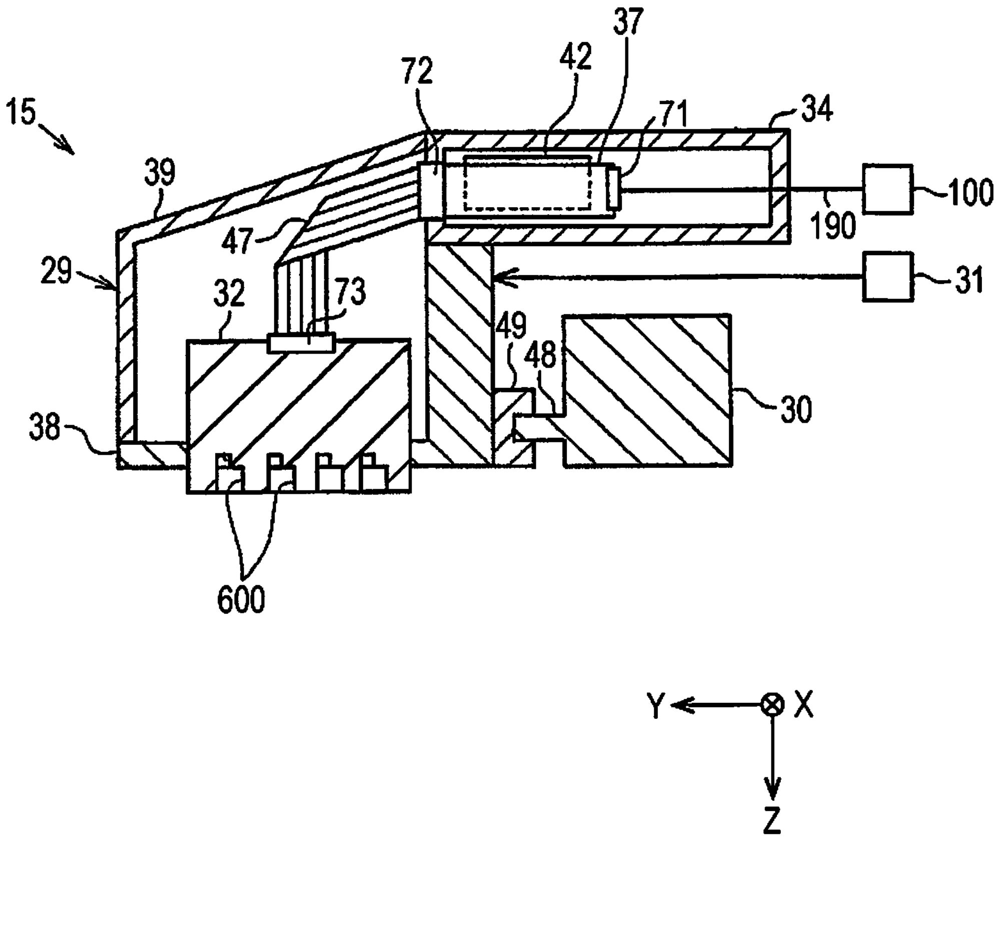
FIG. 7 is a schematic side view illustrating a configuration around a carriage.

As illustrated in FIG. 7, the carriage 29 includes a carriage body 38 having an L-shape cross-section when viewed in the scanning direction X and a cover member 39 that is detachably attached to the carriage body 38, and the carriage body 38 and the cover member 39 constitute a closed space.

Figure 8:
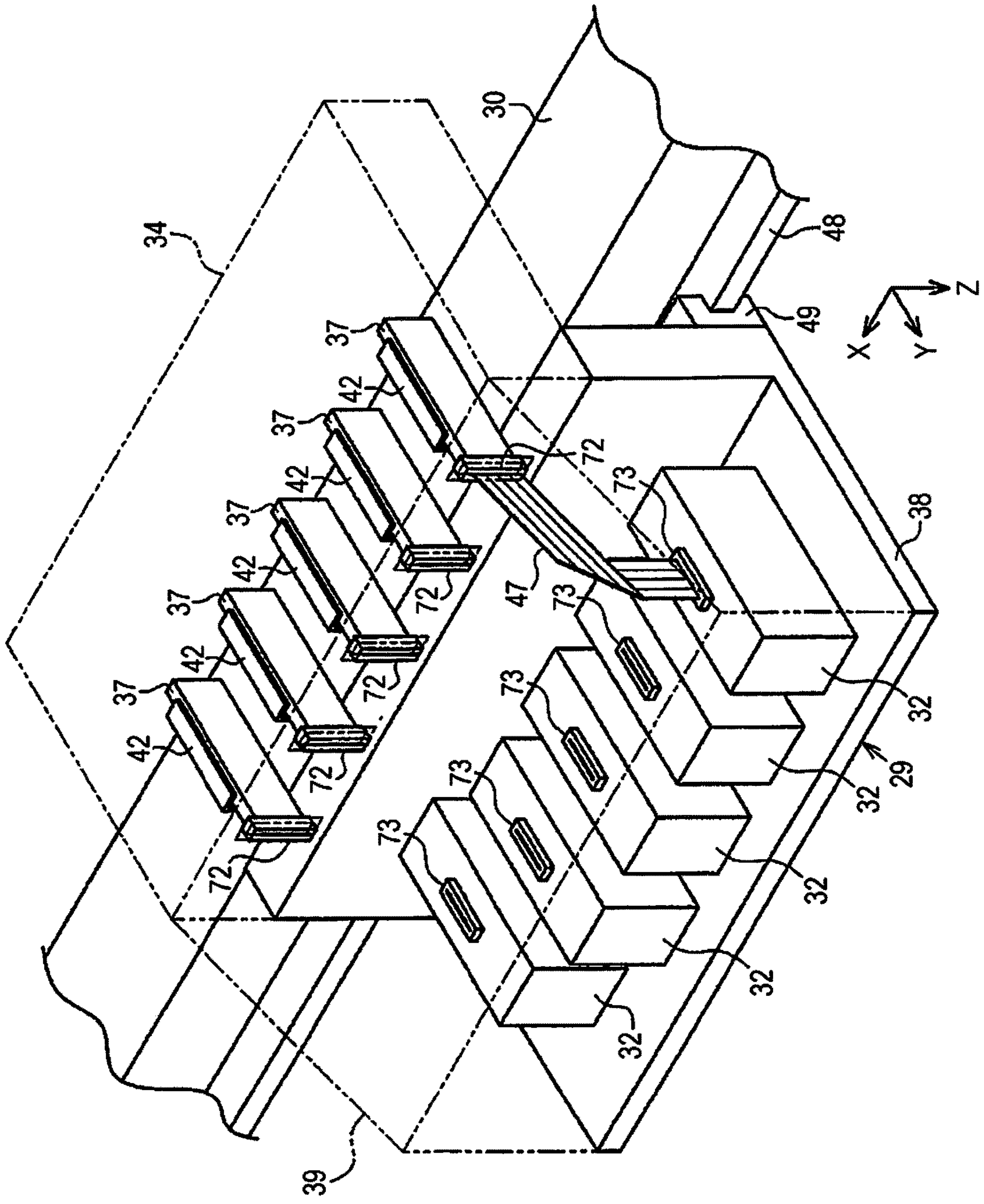
FIG. 8 is a schematic perspective view illustrating an internal configuration of the carriage.

As illustrated in FIGS. 7 and 8, to the upper end of the rear part of the carriage 29, a front end of a rectangular solid-shape heat dissipation case 34 is fixed in which the drive circuit units 37 are accommodated in a state of being in a contact with the heat dissipation case 34. Thus, each of the drive circuit units 37 is supported by the carriage 29 through the heat dissipation case 34. The drive circuit units 37 are supported in the heat dissipation case 34 in a state of being arrayed at equal intervals in the scanning direction X. A radiator plate 42 that releases heat that has been generated in each of the drive circuit units 37 is installed to the drive circuit unit 37.

Here, the heat dissipation case 34 has a configuration in which the heat that has been generated in each of the drive circuit units 37 is dissipated to the outside, and it is preferable that the heat dissipation case 34 is configured as described below. That is, it is preferable that, the heat dissipation case 34 has a large contact area with the drive circuit units 37 in order to increase a heat transfer amount from the drive circuit unit 37. In addition, it is preferable that the heat dissipation case 34 is formed of a metal material with high thermal conductivity such as aluminum in order to make it easier to conduct heat from the inside of the heat dissipation case 34, which is in contact with the drive circuit unit 37, to the outside of the heat dissipation case 34, which is in contact with outdoor air. In addition, it is preferable that a heat dissipating fin is provided outside the heat dissipation case 34, and the heat dissipation case 34 has a large area that is in contact with outdoor air in order to increase dissipation to the outside.

Each of the drive circuit units 37 is electrically connected to the control section 100 through the flexible flat cable 190 and the drive circuit input connector 71, and receives a clock signal Sck, a data signal Data, control signals LAT and CH, digital data dA1, dB1, dA2, dB2, dA3, dB3, dA4, and dB4 from the control section 100.

In addition, each of the drive circuit units 37 includes a drive circuit output connector 72 exposed from the front surface of the heat dissipation case 34 to the carriage 29. In addition, each of the head units 32 includes a head unit input connector 73 on the upper surface of the head unit 32. To the drive circuit output connector 72, for example, one end of the connection cable 47 constituted by a flexible flat cable (FFC) or the like is removably connected (so as to be detachable), and to the head unit input connector 73, the other end of the connection cable 47 is removably connected. That is, the drive circuit units 37 are respectively electrically controlled to the head units 32 through the connection cables 47, and each of the head units 32 receives the clock signal Sck, the data signal Data, the control signals LAT and CH, and the drive signals COMA1, COMB1, COMA2, COMB2, COMA3, COMB3, COMA4, and COMB4 from the corresponding drive circuit unit 37.

The head unit 32 ejects liquid from the ejecting section 600 in accordance with the clock signal Sck, the data signal Data, the control signals LAT and CH, and the drive signals COMA1, COMB1, COMA2, COMB2, COMA3, COMB3, COMA4, and COMB4.

The guide member 30 includes a guide rail section 48 that extends in the scanning direction X at the bottom of the front surface of the guide member 30. The carriage 29 is movably supported in the scanning direction X by the guide rail section 48 in a carriage supporting section 49 provided at the bottom of the back surface of the carriage 29. That is, the carriage supporting section 49 is connected to the guide rail section 48 so as to slide onto the guide rail section 48 in the scanning direction X. That is, the carriage 29 supports the head unit 32 including the ejecting sections 600 and the heat dissipation case 34 including the drive circuit units 37, and is reciprocated in the scanning direction X while being guided by the guide rail section 48 of the guide member 30 in the carriage supporting section 49 by driving the carriage motor 31. That is, in the embodiment, the ejecting sections 600 and the drive circuit units 37 each including the circuit substrate are provided in the movable carriage 29.

As a result, a wiring length from the drive circuit 50 to the head unit 32 can be reduced, and a drive signal COMA or COMB having good waveform accuracy can be applied to a piezoelectric element 60, and liquid can be ejected accurately.

In addition, the carriage 29 is positioned on the front side of the guide member 30, and the heat dissipation case 34 that accommodates the drive circuit units 37 is positioned on the upper side of the guide member 30. As a result, rotation moment of the carriage 29 by using the carriage supporting section 49 as a supporting point is reduced to small, and the length of the connection cable 47 can be also reduced. Thus, the weight balance of the carriage 29 is stabilized, and signals respectively output from the drive circuit units 37 to the head units 32 are stabilized.

1-5. Configuration of Head

Figure 9:
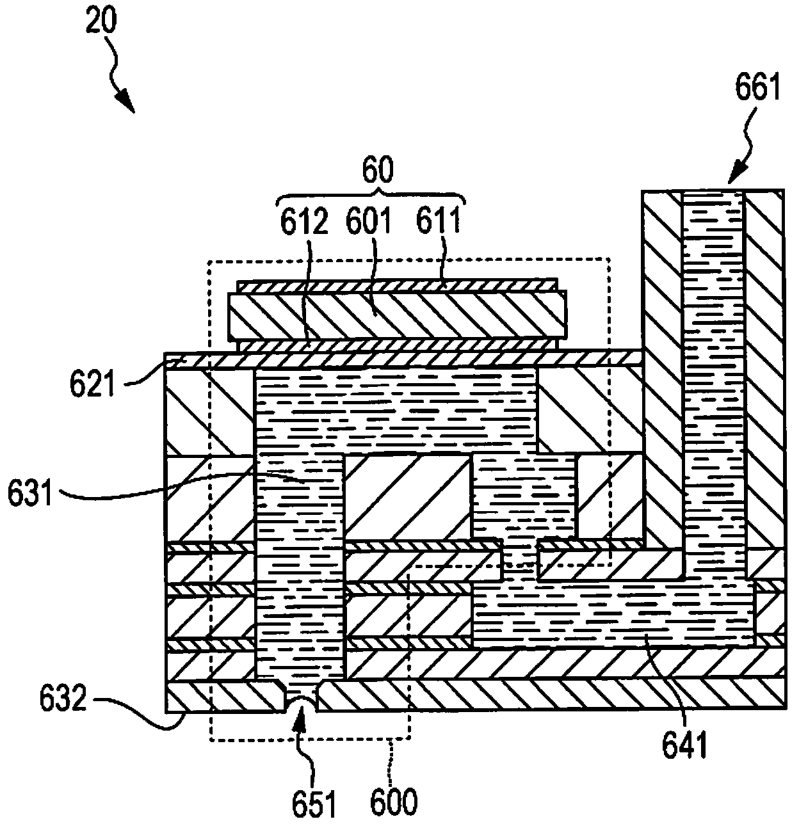
FIG. 9 is a schematic diagram illustrating an ejecting section of a head unit.

FIG. 9 is a diagram illustrating a schematic configuration corresponding to a single ejecting section 600 in the head 20. As illustrated in FIG. 9, the head 20 includes the ejecting section 600 and a reservoir 641.

The reservoir 641 is provided for a respective color of ink, and ink stored in an ink cartridge or the like is introduced into the reservoir 641 through a supply port 661.

The ejecting section 600 includes the piezoelectric element 60, a diaphragm 621, a cavity (pressure chamber) 631, and a nozzle 651. The diaphragm 621 that functions as a diaphragm that is displaced (bent and vibrated) by the piezoelectric element 60 provided on the upper surface of the diaphragm 621 in FIG. 9, and causes the internal volume of the cavity 631 filled up with ink to be increased/decreased. The nozzle 651 is an opening section that is provided on a nozzle plate 632 and is communicated with the cavity 631. The cavity 631 is filled up with liquid (for example, ink), and the internal volume of the cavity 631 is changed due to displacement of the piezoelectric element 60. The nozzle 651 is communicated with the cavity 631, and ejects liquid in the cavity 631 as a droplet depending on a change in the cavity 631.

The piezoelectric element 60 illustrated in FIG. 9 has a structure in which a piezoelectric body 601 is held by a pair of electrodes 611 and 612. In the piezoelectric body 601 having such a structure, the central part bends in the vertical direction with the electrodes 611 and 612, and the diaphragm 621, compared with both end parts of the piezoelectric body 601 in FIG. 9 in accordance with the voltages that have been applied to the electrodes 611 and 612. Specifically, the piezoelectric element 60 bends in the upward direction when the drive voltage Vout of the drive signal COMA (or COMB) increases and bends in the downward direction when the drive voltage Vout decreases. In such a configuration, when the piezoelectric element 60 bends in the upward direction, the internal volume of the cavity 631 increases, such that ink is drawn from the reservoir 641, and when the piezoelectric element 60 bends in the downward direction, the internal volume of the cavity 631 is reduced, such that ink is ejected from the nozzle 651 in accordance with the degree of the reduction.

That is, in the head 20, an ink amount to be ejected from the ejecting section 600 is changed depending on the size of an amplitude of the drive signals COMA or COMB. Specifically, output of a large ink drop is performed when the size of the amplitude of the drive signal COMA (or COMB) supplied to the head 20 is large, and output of a small ink drop is performed when the size of the amplitude of the drive signal COMA (or COMB) is small.

The piezoelectric element 60 is not limited to the illustrated structure, and it is sufficient that the piezoelectric element 60 corresponds to a type in which the piezoelectric element 60 is caused to be deformed to eject liquid such as ink. In addition, the displacement of the piezoelectric element 60 is not limited to the bending vibration, and the piezoelectric element 60 may correspond to a configuration using so-called longitudinal vibration.

In addition, the piezoelectric element 60 is provided so as to correspond to the cavity 631 and the nozzle 651 in the head 20, and the piezoelectric element 60 is provided so as to also correspond to the selection unit 230 in FIG. 4. Therefore, a set of the piezoelectric element 60, the cavity 631, and the selection unit 230 is provided for each of the nozzles 651.

Figure 10:
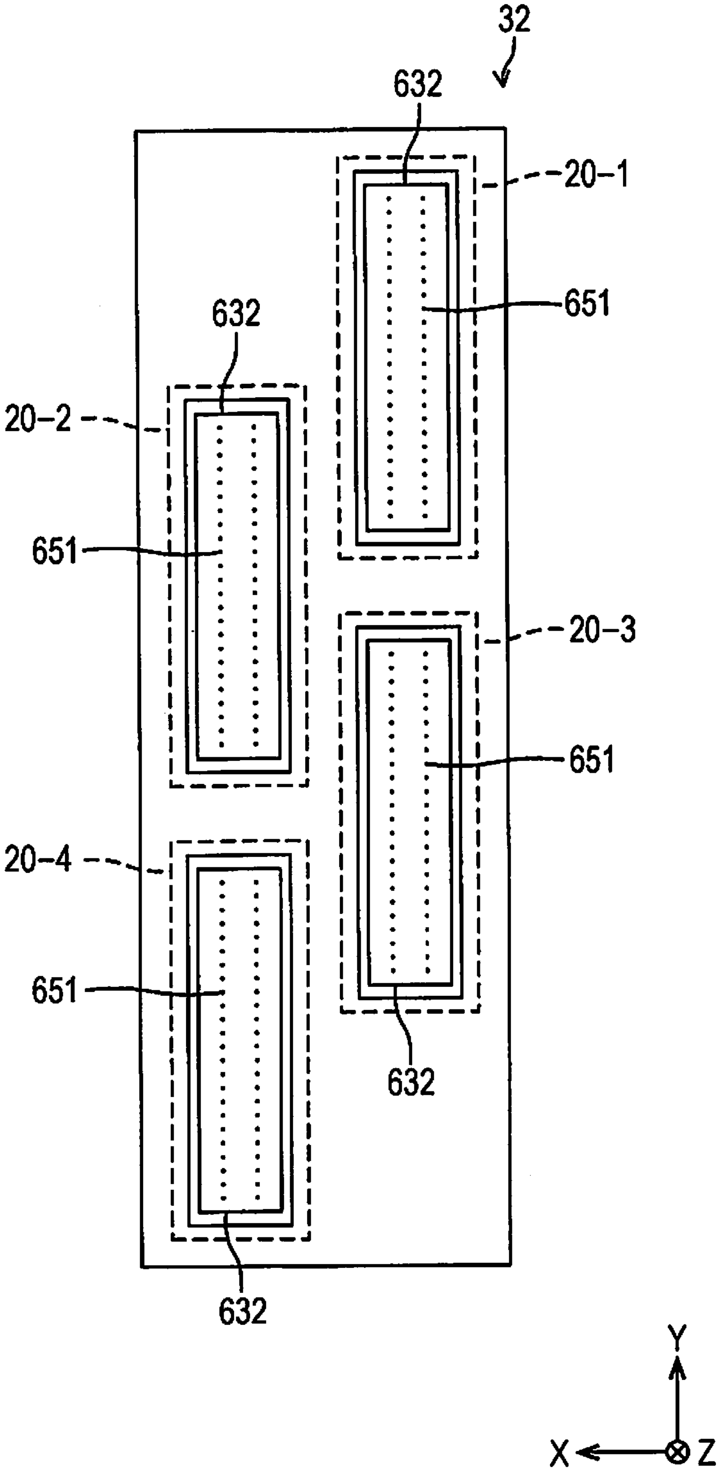
FIG. 10 is a diagram illustrating a configuration of the ejecting sections in a head.

FIG. 10 is a diagram illustrating an ejecting surface of the head unit 32 according to the embodiment. As described above, in the embodiment, the drive circuit unit 37 outputs, to the head unit 32, the four pairs of the drive signals COMA1 and COMB1, the drive signals COMA2 and COMB2, the drive signals COMA3 and COMB3, and the drive signals COMA4 and COMB4. In addition, the head unit 32 is configured so as to include the four heads 20-1, 20-2, 20-3, and 20-4 corresponding to the respective four pairs of the drive signals.

As illustrated in FIG. 10, the four heads 20-1, 20-2, 20-3, and 20-4 are disposed in the front/rear direction Y in a staggered pattern. Specifically, the heads 20-1 and 20-3 are provided in the front/rear direction Y, and the heads 20-2 and 20-4 are provided in the front/rear direction Y, which are shifted relative the heads 20-1 and 20-3 in the scanning direction X. In addition, the heads 20-1 and 20-3 are disposed so as to be shifted relative to the heads 20-2 and 20-4 in the front/rear direction Y by half a pitch. When the four heads 20-1, 20-2, 20-3, and 20-4 are disposed in the front/rear direction Y in a staggered pattern as described above, the nozzles 651 are caused to be partially redundant in the front/rear direction Y, to form a row of the nozzles 651, which is continuous in the front/rear direction Y.

In the embodiment, when the drive signals COMA1, COMA2, COMA3, and COMA4 need not be particularly distinguished, the number of each reference symbol is omitted, and the drive signal is simply referred to as "drive signal COMA", and when the drive signals COMB1, COMB2, COMB3, and COMB4 need not be particularly distinguished, the number of each reference symbol is omitted, and the drive signal is simply referred to as "drive signal COMB".

In addition, as a method in which a dot is formed on the medium M, in addition to a method in which an ink drop is ejected once to form a single dot, there is a method (second method) in which a single dot is formed by allowing an ink drop to be ejected more than twice in a unit of a time period, causing one or more ink drops that have been ejected in the unit of the time period to land on the medium M, and combining the landings of one or more ink drops, and a method (third method) in which two or more dots are formed without combining of two or more ink drops. In the following description, a case is described in which a dot is formed by the above-described second method.

In the embodiment, for the second method, the following example is assumed and described. That is, in the embodiment, in the formation of a single dot, four gradations such as a large dot, a medium dot, a small dot, and a non-record dot are expressed by causing ink to be ejected at most twice. In order to express such four gradations, in the embodiment, two types of the drive signals COMA and COMB are used, and in each of the drive signals COMA and COMB, a first half pattern and a second half pattern are included in a single cycle. In the single cycle, the drive signal COMA or COMB is selected (or neither of the drive signals COMA and COMB is selected) depending on a gradation to be expressed in each of the first half and the second half of the single cycle, and the selected drive signal is supplied to the piezoelectric element 60.

Figure 11:
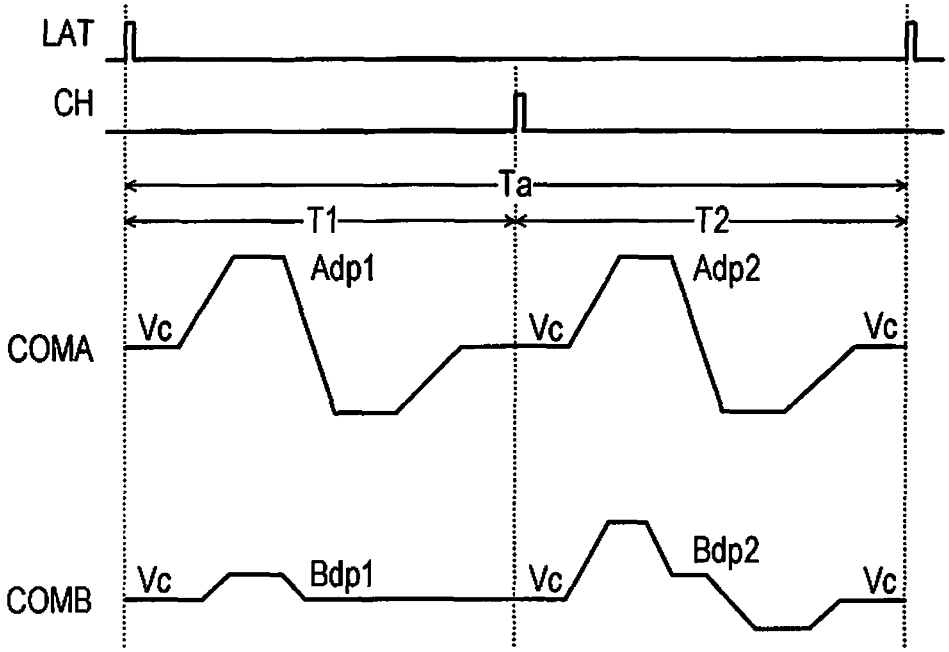
FIG. 11 is a diagram illustrating waveforms and the like of drive signals COMA and COMB.

FIG. 11 is a diagram illustrating waveforms of the drive signals COMA and COMB. In the embodiment, as illustrated in FIG. 11, the drive signal COMA has a waveform in which a trapezoidal waveform Adp1 arranged in a time period T1 that ranges from rise of a control signal LAT to rise of a control signal CH and a trapezoidal waveform Adp2 arranged in a time period T2 that ranges from the rise of the control signal CH to rise of the next control signal LAT sequentially appear. A new dot is formed on the medium M for each cycle Ta for printing, which is a time period constituted by the time period T1 and the time period T2.

In the embodiment, the trapezoidal waveforms Adp1 and Adp2 have substantially the same waveform in which a specific amount of ink, specifically, a medium amount of ink is caused to ejected from a nozzle 651 corresponding to a piezoelectric element 60 when the trapezoidal waveforms Adp1 and Adp2 are supplied to the piezoelectric element 60.

The drive signal COMB has a waveform in which a trapezoidal waveform Bdp1 arranged in the time period T1 and a trapezoidal waveform Bdp2 arranged in the time period T2 sequentially appear. In the embodiment, the trapezoidal waveforms Bdp1 and Bdp2 are different waveforms. From among the trapezoidal waveforms Bdp1 and Bdp2, the trapezoidal waveform Bdp1 is a waveform used to prevent viscosity of ink near the opening section of the nozzle 651 from increasing by vibrating the ink slightly. Therefore, even when the trapezoidal waveform Bdp1 is supplied to the one end of the piezoelectric element 60, an ink drop is not ejected from the nozzle 651 corresponding to the piezoelectric element 60. In addition, the trapezoidal waveform Bdp2 is a waveform different from the trapezoidal waveform Adp1 (Adp2). The trapezoidal waveform Bdp2 is a waveform in which ink the amount of which is smaller than the above-described specific amount is caused to be ejected from the nozzle 651 corresponding to the piezoelectric element 60 when the trapezoidal waveform Bdp2 is supplied to the one end of the piezoelectric element 60.

Here, in the embodiment, the drive signal COMA is a drive signal that is used to eject a medium amount of ink, and has a large amplitude compared with the drive signal COMB, and the drive signal COMB is a drive signal that is used to eject a small amount of ink or slightly vibrate the piezoelectric element 60, and has a small amplitude compared with the drive signal COMA. That is, in the embodiment, the amplitude of the drive signal COMA (example of "first drive signal") is larger than the amplitude of the drive signal COMB (example of "second drive signal").

Voltages at start timings of the trapezoidal waveforms Adp1, Adp2, Bdp1, and Bdp2 and voltages at end timings of the trapezoidal waveforms Adp1, Adp2, Bdp1, and Bdp2 are common at the voltage Vc. That is, each of the trapezoidal waveforms Adp1, Adp2, Bdp1, and Bdp2 has a waveform in which the voltage starts at the voltage Vc and ends at the voltage Vc.

Here, the selection unit 230 generates a drive voltage Vout corresponding to one of "large dot", "medium dot", "small dot", and "non-record dot", for each of the corresponding ejecting sections 600, by combining the waveform of one of the drive signals COMA and COMB in the time period T1 and the waveform of one of the drive signals COMA and COMB in the time period T2, in accordance with the data signal Data, and the control signals LAT and CH.

Figure 12:
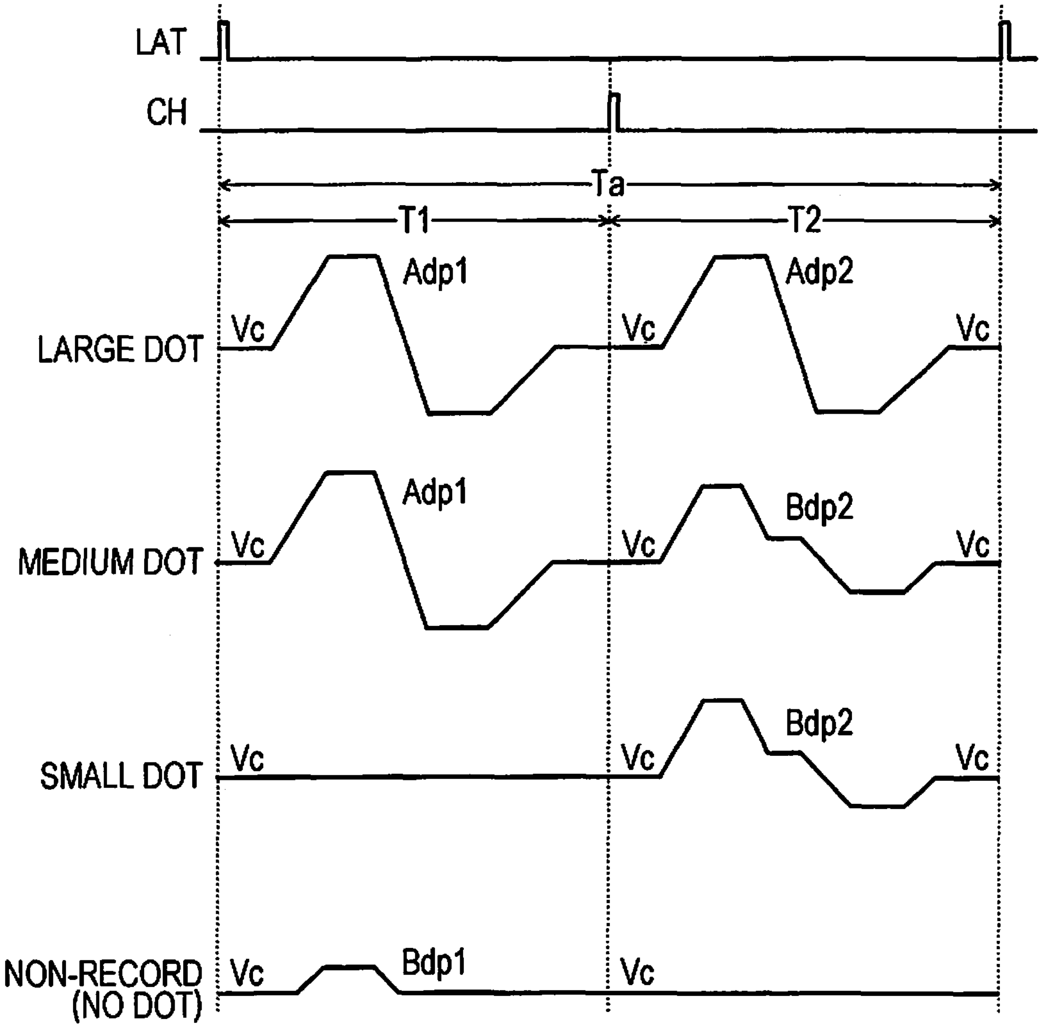
FIG. 12 is a diagram illustrating waveforms of drive voltages Vout.

FIG. 12 is a diagram illustrating waveforms of the drive voltages Vout of the respective "large dot", "medium dot", "small dot", and "non-record dot".

As illustrated in FIG. 12, the drive voltage Vout corresponding to "large dot" has a waveform in which the trapezoidal waveform Adp1 of the drive signal COMA in the time period T1 and the trapezoidal waveform Adp2 of the drive signal COMA in the time period T2 sequentially appear. When such a drive voltage Vout is supplied to the one end of the piezoelectric element 60, in the cycle Ta, a medium amount of ink is ejected from the nozzle 651 corresponding to the piezoelectric element 60 twice. Therefore, the ink land and coalesce on the medium M to form the large dot.

The drive voltage Vout corresponding to "medium dot" has a waveform in which the trapezoidal waveform Adp1 of the drive signal COMA in the time period T1 and the trapezoidal waveform Bdp2 of the drive signal COMB in the time period T2 sequentially appear. When such a drive voltage Vout is supplied to the one end of the piezoelectric element 60, in the cycle Ta, a medium amount of ink and a small amount of ink are ejected from the nozzle 651 corresponding to the piezoelectric element 60 in two separate steps. Therefore, the ink land and coalesce on the medium M to form the medium dot.

The drive voltage Vout corresponding to "small dot" has the previous voltage Vc that has been held by the capacitance characteristic of the piezoelectric element 60 in the time period T1, and has the trapezoidal waveform Bdp2 of the drive signal COMB in the time period T2. When such a drive voltage Vout is supplied to the one end of the piezoelectric element 60, in the cycle Ta, a small amount of ink is ejected from the nozzle 651 corresponding to the piezoelectric element 60 only in the time period T2. Therefore, the ink lands on the medium M to form the small dot.

The drive voltage Vout corresponding to "non-record dot" has the trapezoidal waveform Bdp1 of the drive signal COMB in the time period T1 and has the previous voltage Vc that has been held by the capacitance characteristic of the piezoelectric element 60 in the time period T2. When such a drive voltage Vout is supplied to the one of the piezoelectric element 60, in the cycle Ta, the nozzle 651 corresponding to the piezoelectric element 60 only vibrates slightly in the time period T1, and ink is not ejected. Therefore, ink does not land on the medium M, and a dot is not formed.

That is, in the embodiment, the drive signal COMA1 output (example of "first drive signal") from the drive circuit 50-a1 and the drive signal COMB1 (example of "the second drive signal") output from the drive circuit 50-b1 are exclusively output to the piezoelectric element 60 (example of "first drive element") of the head 20-1 in accordance with the selection by the selection unit 230. In addition, similarly, even in the drive circuits 50-a2 and 50-b2, the drive circuits 50-a3 and 50-b3, and the drive circuits 50-a4 and 50-b4, the drive signals COMA and COMB are exclusively output to the corresponding piezoelectric element 60. Here, strictly speaking, "exclusive" means that output of the drive signal COMA and output of the drive signal COMB are not performed at the same time.

Here, each of the four pairs of the drive circuits 50-a1 and 50-b1, the drive circuits 50-a2 and 50-b2, the drive circuits 50-a3 and 50-b3, and the drive circuits 50-a4 and 50-b4 generates the trapezoidal waveforms Adp1, Adp2, Bdp1, and Bdp2 in synchronization with the time periods T1 and T2. In addition, some of the generated trapezoidal waveforms Adp1, Adp2, Bdp1, and Bdp2 are output to each of the piezoelectric elements 60 of the corresponding head 20-1, 20-2, 20-3, or 20-4 in accordance with the selection by the selection units 230.

In the embodiment, each of the four pairs of the drive circuits 50-a1 and 50-b1, the drive circuits 50-a2 and 50-b2, the drive circuits 50-a3 and 50-b3, and the drive circuits 50-a4 and 50-b4 exclusively performs output of the drive signals COMA and COMB in accordance with the selection by the selection unit 230, and therefore, current consumption can be reduced, and heat generated in the drive circuit unit 37 can be reduced.

1-6. Configuration of Drive Circuit Unit Substrate

Figure 13:
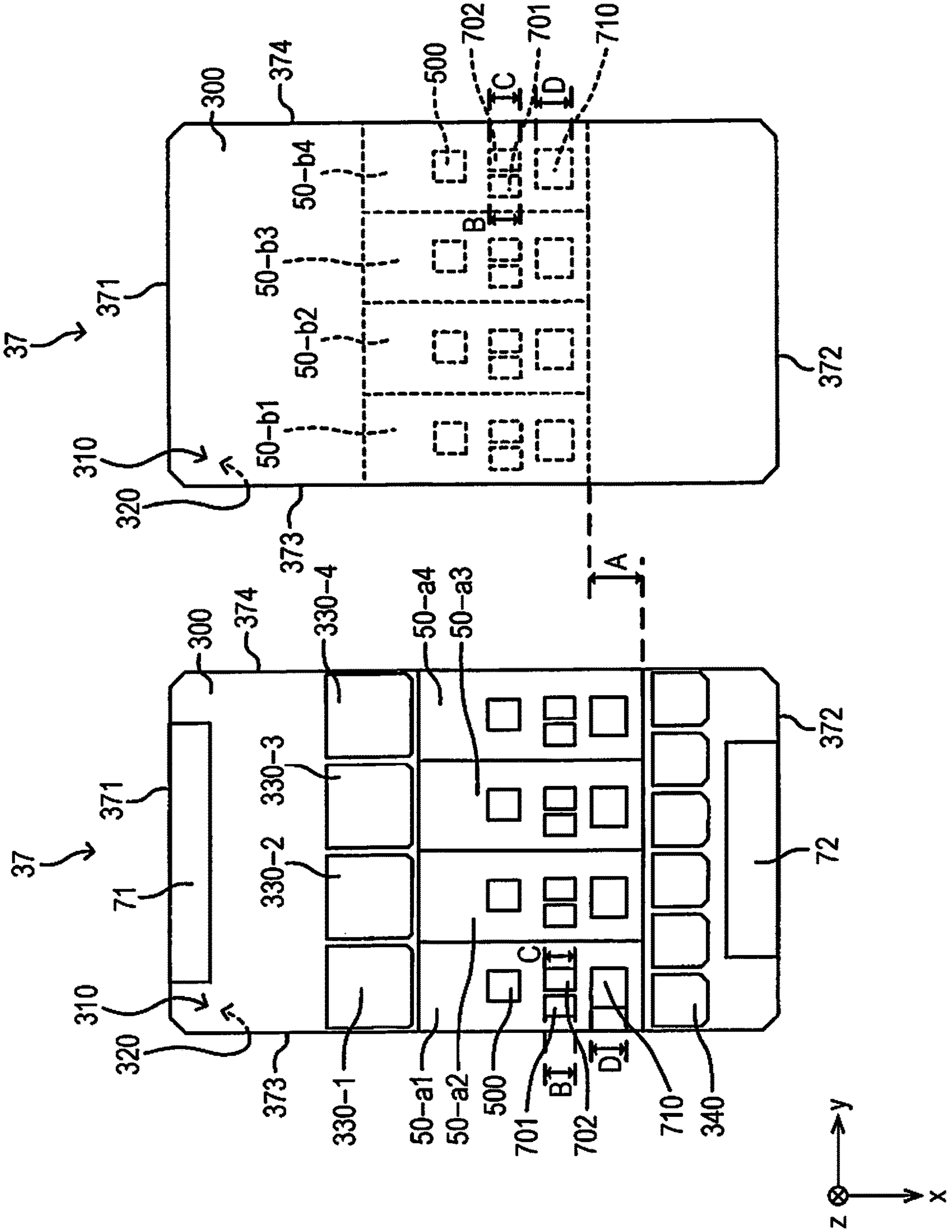
FIG. 13 is a diagram illustrating a substrate configuration of drive circuit units according to a first embodiment.

FIG. 13 is a diagram illustrating a substrate configuration of the drive circuit unit 37 according to the embodiment. The broken line area in FIG. 13 corresponds to a configuration of circuit components mounted on a second surface 320. Here, in FIG. 13, a description is made by assuming that a direction from a short side 371 to a short side 372 of a substrate 300, that is, a direction parallel to a long side 373 is "long side direction x", and a direction from the long side 373 to a long side 374, that is, a direction parallel to the short side 371 is "short side direction y", and a direction from a first surface 310 to the second surface of the substrate 300 is "depth direction z".

The drive circuit unit 37 includes the substrate 30, and the drive circuit input connector 71 and the drive circuit output connector 72, the four pairs of the drive circuits 50-a1 and 50-b1, the drive circuits 50-a2 and 50-b2, the drive circuits 50-a3 and 50-b3, and the drive circuits 50-a4 and 50-b4, capacitors 330-1, 330-2, 330-3, and 330-4, and two or more capacitors 340 mounted on the substrate 300.

The substrate 300 has a planar shape, which is approximately rectangular, and is formed so as to include a pair of the short sides 371 and 372 and a pair of the long sides 373 and 374.

A configuration of the first surface 310 of the substrate 300 according to the embodiment is described with reference to FIG. 13.

The diagram illustrated on the left side of FIG. 13 is a view when viewed from the first surface 310 of the drive circuit unit 37.

On the first surface 310 of the substrate 300, the drive circuit input connector 71 and the drive circuit output connector 72 are disposed so as to face each other. Specifically, the drive circuit input connector 71 is mounted along the short side 371, and the drive circuit output connector 72 is mounted along the short side 372.

The drive circuits 50-a1, 50-a2, 50-a3, and 50-a4 are mounted side by side in the short side direction y in this order in an area between the drive circuit input connector 71 and the drive circuit output connector 72 mounted on the first surface 310 of the substrate 300 such that the drive circuit input connector 71 and the drive circuit output connector 72 face each other.

Specifically, an implementation area of the drive circuit 50-a1 is disposed along the long side 373 of the substrate 300. An implementation area of the drive circuit 50-a2 is disposed close to and approximately in parallel to the implementation area of the drive circuit 50-a1 in the short side direction y. An implementation area of the drive circuit 50-a3 is disposed close to and approximately in parallel to the implementation area of the drive circuit 50-a2 in the short side direction y. An implementation area of the drive circuit 50-a4 is disposed close to and approximately in parallel to the implementation area of the drive circuit 50-a3 in the short side direction y, and is also disposed along the long side 374 of the substrate 300.

In addition, on the substrate 300, the capacitors 330-1, 330-2, 330-3, and 330-4, each of which is used to stabilize a voltage Vh, are mounted.

Specifically, the capacitor 330-1 is provided between the drive circuit 50-a1 and the drive circuit input connector 71, the capacitor 330-2 is provided between the drive circuit 50-a2 and the drive circuit input connector 71, the capacitor 330-3 is provided between the drive circuit 50-a3 and the drive circuit input connector 71, and the capacitor 330-4 is provided between the drive circuit 50-a4 and the drive circuit input connector 71.

In addition, in an area between the area on which the drive circuits 50-a1, 50-a2, 50-a3, and 50-a4 are mounted and the drive circuit output connector 72, two or more capacitors 340, each of which is used to stabilize the reference voltage VBS, are arrayed in the short side direction y.

A configuration of the second surface 320 of the substrate 300 is described below with reference to FIG. 13.

The diagram illustrated on the right of FIG. 13 is a perspective view illustrating the configuration of the second surface 320 when viewed from the first surface 310 side of the drive circuit unit 37.

At least the drive circuits 50-b1, 50-b2, 50-b3, and 50-b4 are mounted on the second surface 320 of the substrate 300 so as to be arrayed in the short side direction y in this order.

Specifically, an implementation area of the drive circuit 50-b1 is disposed along the long side 373 of the substrate 300. An implementation area of the drive circuit 50-b2 is disposed close to and approximately in parallel to the implementation area of the drive circuit 50-b1 in the short side direction y. An implementation area of the drive circuit 50-b3 is disposed close to and approximately in parallel to the implementation area of the drive circuit 50-b2 in the short side direction y. An implementation area of the drive circuit 50-b4 is disposed close to and approximately in parallel to the implementation area of the drive circuit 50-b3 in the short side direction y, and is also disposed along the long side 374 of the substrate 300.

Here, the drive circuit 50-a1 mounted on the first surface 310 and the drive circuit 50-b1 mounted on the second surface 320 output the respective drive signals COMA1 and COMB1 to the piezoelectric elements 60 provided in the same head 20-1 as described above. Here, the implementation areas of the drive circuits 50-a1 and 50-b1 are disposed so as to overlap one another in the short side direction y, and the drive circuits 50-a1 and 50-b1 are mounted so as to be shifted relative to each other by "A" and partially overlap one another in the long side direction x.

That is, in the embodiment, the drive circuit 50-a1 (example of "first drive circuit") that performs output of the drive signal COMA1 (example of "first drive signal") is mounted on the first surface 310, and the drive circuit 50-b1 (example of "second drive circuit") that performs output of the drive signal COMB1 (example of "second drive signal") is mounted on the second surface 320, which is used to drive piezoelectric elements 60 provided in a corresponding ejecting section 600 (example of "first ejecting section") of the head 20-1.

Here, in the drive circuit unit 37, in the depth direction z (example of "plan view"), the implementation area of the drive circuit 50-a1 and the implementation area of the drive circuit 50-b1 are disposed so as to at least partially overlap one another.

Similarly, the drive circuit 50-a2 mounted on the first surface 310 and the drive circuit 50-b2 mounted on the second surface 320 output the respective drive signals COMA2 and COMB2 to the piezoelectric elements 60 provided in the same head 20-2 as described above. Here, the implementation areas of the drive circuit 50-a2 and the drive circuit 50-b2 are disposed so as to overlap in the short side direction y, and the drive circuit 50-a2 and the drive circuit 50-b2 are mounted so as to be shifted relative to each other by "A" and partially overlap one another in the long side direction x.

Similarly, the drive circuit 50-a3 mounted on the first surface 310 and the drive circuit 50-b3 mounted on the second surface 320 output the respective drive signals COMA3 and COMB3 to the piezoelectric elements 60 provided in the same head 20-3 as described above. Here, the implementation areas of the drive circuit 50-a3 and the drive circuit 50-b3 are disposed so as to overlap one another in the short side direction y, and the drive circuit 50-a3 and the drive circuit 50-b3 are mounted so as to be shifted relative to each other by "A" and partially overlap one another in the long side direction x.

Similarly, the drive circuit 50-a4 mounted on the first surface 310 and the drive circuit 50-b4 mounted on the second surface 320 output the respective drive signals COMA4 and COMB4 to the piezoelectric elements 60 provided in the same head 20-4 as described above. Here, the implementation areas of the drive circuit 50-a4 and the drive circuit 50-b4 are disposed so as to overlap one another in the short side direction y and the drive circuit 50-a4 and the drive circuit 50-b4 are mounted so as to be shifted relative to each other by "A" and partially overlap one another in the long side direction x.

As described above, in the drive circuit unit 37 according to the embodiment, the drive circuits 50-a1 and 50-b1 are respectively mounted on the first surface 310 and the second surface 320 of the substrate 300. Similarly, the drive circuits 50-a2 and 50-b2 are respectively mounted on the first surface 310 and the second surface 320 of the substrate 300. Similarly, the drive circuits 50-a3 and 50-b3 are respectively mounted on the first surface 310 and the second surface 320 of the substrate 300. Similarly, the drive circuits 50-a4 and 50-b4 are respectively mounted on the first surface 310 and the second surface 320 of the substrate 300. As described above, when the drive circuits 50 that drive the same head 20 are respectively mounted on the first surface 310 and the second surface 320 of the substrate 300, and therefore, the size of the substrate 300 can be reduced.

In addition, in the four pairs of the drive circuits 50-a1 and 50-b1, the drive circuits 50-a2 and 50-b2, the drive circuits 50-a3 and 50-b3, and the drive circuits 50-a4 and 50-b4 mounted on the drive circuit unit 37, a drive circuit mounted on the first surface and a corresponding drive circuit mounted on the second surface are mounted so as to at least partially overlap one another. As a result, the implementation area of the substrate 300 can be effectively utilized, and the size of the substrate 300 can be further reduced.

In the embodiment, the four pairs of the drive circuits 50-a1 and 50-b1, the drive circuits 50-a2 and 50-b2, the drive circuits 50-a3 and 50-b3, and the drive circuits 50-a4 and 50-b4 are respectively constituted by similar circuit components as described above. In addition, the implementation areas of the drive circuits 50 respectively have similar component arrangements. As a result, load on design and manufacturing of the drive circuits 50 can be reduced when the number of drive circuits 50 mounted on the drive circuit unit 37 is increased or decreased.

In the description of the embodiment, between the four pairs of the drive circuits 50-a1 and 50-b1, the drive circuits 50-a2 and 50-b2, the drive circuits 50-a3 and 50-b3, and the drive circuits 50-a4 and 50-b4, as described above, only the locations of the implementation areas in the short side direction are different, and configurations of the mounted components are similar and mounting arrangements of the circuit components in the implementation areas of the drive circuits are similar. Therefore, a description of the following drive circuits 50-a1 and 50-b1 is made, and a description of the other pairs of the drive circuits 50-a2 and 50-b2, the drive circuits 50-a3 and 50-b3, and the drive circuits 50-a4 and 50-b4 is omitted herein.

Each of the drive circuit 50-a1 and the drive circuit 50-b1 is configured so as to include the integrated circuit apparatus 500, the high-side transistor 701, the low-side transistor 702, and the inductor 710.

In the drive circuit 50-a1, the integrated circuit apparatus 500 is mounted on the side of the drive circuit input connector 71 in the implementation area of the drive circuit 50-a1. In addition, the high-side transistor 701 and the low-side transistor 702 are close and adjacent to each other in the short side direction y, and are mounted on the side of the drive circuit output connector 72, compared with the integrated circuit apparatus 500. In addition, the inductor 710 is mounted on the side of the drive circuit output connector 72, compared with both the high-side transistor 701 and the low-side transistor 702.

As a result, the drive circuit 50-a1 is disposed such that a small signal that is input from the drive circuit input connector 71 and is processed in the integrated circuit apparatus 500 and a large current signal output from the drive circuit output connector 72 through the amplification section 590 and the LPF 560 can be separated from each other, and therefore, mutual signal interfere can be suppressed, and accuracy of the drive signal COMA1 can be improved.

In the drive circuit 50-b1, the integrated circuit apparatus 500 is mounted on the side of the short side 371 in the implementation area of the drive circuit 50-b1. In addition, the high-side transistor 701 and the low-side transistor 702 are close and adjacent to each other in the short side direction y, and are mounted on the side of the short side 372, compared with the integrated circuit apparatus 500. In addition, the inductor 710 is mounted on the side of the short side 372, compared with both the high-side transistor 701 and the low-side transistor 702.

As a result, the drive circuit 50-b1 is disposed such that a small signal that is input from the drive circuit input connector 71 and processed in the integrated circuit apparatus 500 and a large current signal output from the drive circuit output connector 72 through the amplification section 590 and the LPF 560 can be separated from each other, and therefore, mutual signal interference can be suppressed, and the accuracy of the drive signal COMB1 can be improved.

Here, in the embodiment, the high-side transistor 701 (example of "first transistor") of the drive circuit 50-a1 (example of "first drive circuit") mounted on the first surface 310 of the substrate 300 (example of "circuit substrate") and the high-side transistor 701 (example of "second transistor") of the drive circuit 50-b1 (example of "second drive circuit") mounted on the second surface 320 of the substrate 300 are disposed so as not to overlap one another in the depth direction z (example of "plan view").

Specifically, the drive circuits are mounted such that a gap A between the implementation area of the drive circuit 50-a1 and the implementation area of the drive circuit 50*b*1 in the long direction x of the substrate 300 becomes larger than a length B of each of the high-side transistors 701 mounted on the drive circuit 50-a1 and the drive circuit 50-b1 in the long side direction x.

In addition, the high-side transistor 701 (example of "first transistor") of the drive circuit 50-a1 is disposed so as not to overlap with the high-side transistor 701 (example of "second transistor") and the low-side transistor 702 (example of "fourth transistor") of the drive circuit 50-b1 in the depth direction z (example of "plan view"). In addition, the low-side transistor 702 (example of "third transistor") of the drive circuit 50-a1 is disposed so as not to overlap with the high-side transistor 701 and the low-side transistor 702 of the drive circuit 50-b1 in the depth direction z.

Specifically, the drive circuits are mounted such that a gap A between the implementation area of the drive circuit 50-a1 and the implementation area of the drive circuit 50-b1 in the long direction x of the substrate 300 according to the embodiment becomes larger than both the length B of the high-side transistor 701 of each of the drive circuit 50-a1 and the drive circuit 50-b1 in the long side direction x and a length C of the low-side transistor 702 of each of the drive circuit 50-a1 and the drive circuit 50-b1 in the long side direction x.

Typically, in the drive circuit unit 37, as a transistor mounted in order to realize reduction of the size of the drive circuit unit 37, a surface mount-type transistor is typically used. In addition, a technology is widely used by which heat generated by a transistor is dissipated to the substrate 300 by a heat spreader or the like.

In the embodiment, in the drive circuit unit 37, in order to realize the reduction of the size of the drive circuit unit 37, the drive circuits 50 are respectively mounted on the first surface 310 and the second surface 320 of the substrate 300. If the high-side transistor 701 and the low-side transistor 702 of the drive circuit 50-a1 mounted on the first surface 310 and the high-side transistor 701 and the low-side transistor 702 of the drive circuit 50-b1 mounted on the second surface 320 are disposed so as to overlap one another in the depth direction z, heat is concentrated in an area in which the transistors face, and therefore, the drive circuit unit 37 is likely to fail.

In the drive circuit unit 37 according to the embodiment, the high-side transistor 701 and the low-side transistor 702 of the drive circuit 50 mounted on the first surface 310 and the high-side transistor 701 and the low-side transistor 702 of the corresponding drive circuit 50 mounted on the second surface 320 are disposed so as not to overlap one another in the depth direction z, and therefore, heat generated in the drive circuits 50 of the drive circuit unit 37 can be dispersed, and deterioration of characteristics of the drive circuit unit 37 and a failure thereof can be prevented.

In addition, it is preferable that the inductors 710 respectively mounted on the drive circuit 50-a1 and the drive circuit 50-b1 are disposed on the respective surface of the substrate 300 and so as not to overlap one another. Specifically, the drive circuits are mounted such that the gap A between the implementation area of the drive circuit 50-a1 and the implementation area of the drive circuit 50-b1 of the substrate 300 in the long side direction x becomes larger than a length D of the inductor 710 in the long side direction x.

In the inductor 710 according to the embodiment, the second highest heat next to the high-side transistor 701 and the low-side transistor 702 in the drive circuit 50 occurs. In addition, if the inductor 710 mounted on the first surface 310 and the inductor 710 mounted on the second surface 320 are disposed so as to overlap one another in the depth direction z, the inductors 710 is likely to interfere with each other due to leakage magnetic flux of the inductors 710, thereby affecting ejecting characteristics.

As illustrated in the embodiment, the inductor 710 (example of "first coil") mounted on the drive circuit 50-a1 and the inductor 710 (example of "second coil") mounted on the drive circuit 50-b1 are disposed so as not to overlap one another in the depth direction z, and therefore, in the drive circuit unit 37, heat due to the inductors 710 can be dispersed, and mutual interference of the inductors 710 is reduced, and deterioration of ejecting characteristics can be prevented.

As described above, in the drive circuit unit 37 according to the embodiment, each of the four pairs of the drive circuits 50-a1 and 50-b1, the drive circuits 50-a2 and 50-b2, the drive circuits 50-a3 and 50-b3, and the drive circuits 50-a4 and 50-b4 is mounted so as to become a pair between the first surface 310 and the second surface 320 of the substrate 300.

In addition, the drive circuits 50 that drive the same head 20 are mounted on the respective surfaces of the substrate 300 so as to overlap one another in the short side direction y, and mounted so as to be shifted relative to each other by A in the long side direction x. Here, the drive circuits are mounted such that the gap A between the implementation location of the drive circuit 50 mounted on the first surface 310 and the implementation location of the drive circuit 50 mounted on the second surface 320 in the long side direction x becomes larger than any of the length B of each of the high-side transistors 701 in the long side direction x, the length C of each of the low-side transistors 702 in the long side direction x, and the length D of each of the inductors 710 in the long side direction x.

When the above-described gap A is increased, heat generated in the drive circuit units 37 can be dispersed, but it is difficult to reduce the size of the drive circuit unit 37. Therefore, it is preferable that the gap A between the implementation locations becomes slightly larger than any one of the length B of each of the high-side transistors 701 in the long side direction x, the length C of each of the low-side transistors 702 in the long side direction x, and the length D of each of the inductors 710 in the long side direction x.

1-7. Operation and Effect

As described above, in the liquid ejecting apparatus 1 according to the embodiment, in the substrate 300 on which two or more drive circuits 50 are mounted, the drive circuits 50 each of which outputs the drive signal COMA (or COMB) to the piezoelectric elements 60 are respectively mounted on the first surface 310 and the second surface 320 of the substrate 300, and when the drive circuits respectively mounted on the first surface 310 and the second surface 320 of the substrate 300 partially overlap one another, the size of the substrate 300 can be reduced.

In addition, in the drive circuit 50 on the first surface 310 and the drive circuit 50 on the second surface 320, the high-side transistors 701 each of which has the largest heat from among the components mounted on the corresponding drive circuit 50 are disposed on the respective surfaces of the substrate 300 so as not to overlap one another, and therefore, the heat in the substrate 300 can be dispersed, and a failure and deterioration of characteristics of the drive circuit 50, which are caused by the heating, can be suppressed.

In addition, compared with a case in which the drive circuit 50 generates the drive signal COMA (or COMB) by the class A/B amplification, when the drive circuit 50 generates the drive signal COMA (or COMB) by the class D amplification, power consumption and a calorific value are reduced, and the number of heat dissipation radiator plates 42 and an area for the radiator plates can be reduced, and therefore, the size and weight of the drive circuit 37 can be reduced. Thus, in the liquid ejecting apparatus 1 according to the embodiment, the size reduction can be further allowed.

In addition, when the inductors 710 provided in the respective drive circuits 50 are disposed on the respective surfaces of the substrate 300 so as not to overlap one another, heat generated in the inductors 710, which is the second largest heat next to the high-side transistor 701 and the low-side transistor 702, can be dispersed, and therefore, a failure and deterioration of characteristics of the drive circuit 50, which are caused by the heating, can be suppressed. In addition, mutual interference between the inductor 710 mounted on the first surface 310 and the inductor 710 mounted on the second surface 320 is likely to be suppressed, and good ejecting characteristics can be obtained.

2. Second Embodiment

A liquid ejecting apparatus 1 according to a second embodiment further disperses heat in a drive circuit unit 37 by changing implementation arrangement of two or more drive circuits 50 mounted on the drive circuit unit 37. In the liquid ejecting apparatus 1 according to the second embodiment, the same symbol is assigned to a configuration element similar to that of the first embodiment, and a difference from the first embodiment is described, and a duplicate description of the first embodiment is omitted herein.

A structure of the liquid ejecting apparatus 1 according to the second embodiment is similar to that of the first embodiment illustrated in FIGS. 1 and 2, and therefore, the illustration and the description are omitted herein. In addition, an electrical configuration of the liquid ejecting apparatus 1 according to the second embodiment is similar to that of the first embodiment illustrated in FIGS. 3 and 4, and the illustration and the description are omitted herein. In addition, an electrical configuration and an operation of a drive circuit 50 according to the second embodiment are similar to those of the first embodiment illustrated in FIGS. 5 and 6, and the illustration and the description are omitted herein. In addition, the carriage 29 according to the second embodiment and a peripheral configuration of the carriage 29 are similar to those of the first embodiment illustrated in FIGS. 7 and 8, and the illustration and the description are omitted herein. In addition, a configuration and an operation of a head unit 32 and a head 20 according to the second embodiment are similar to those of the first embodiment illustrated in FIGS. 9, 10, 11 and 12, and the illustration and the description are omitted herein. Even in the second embodiment, similar to the first embodiment, an amplitude of a drive signal COMA is larger than an amplitude of a drive signal COMB.

Figure 14:
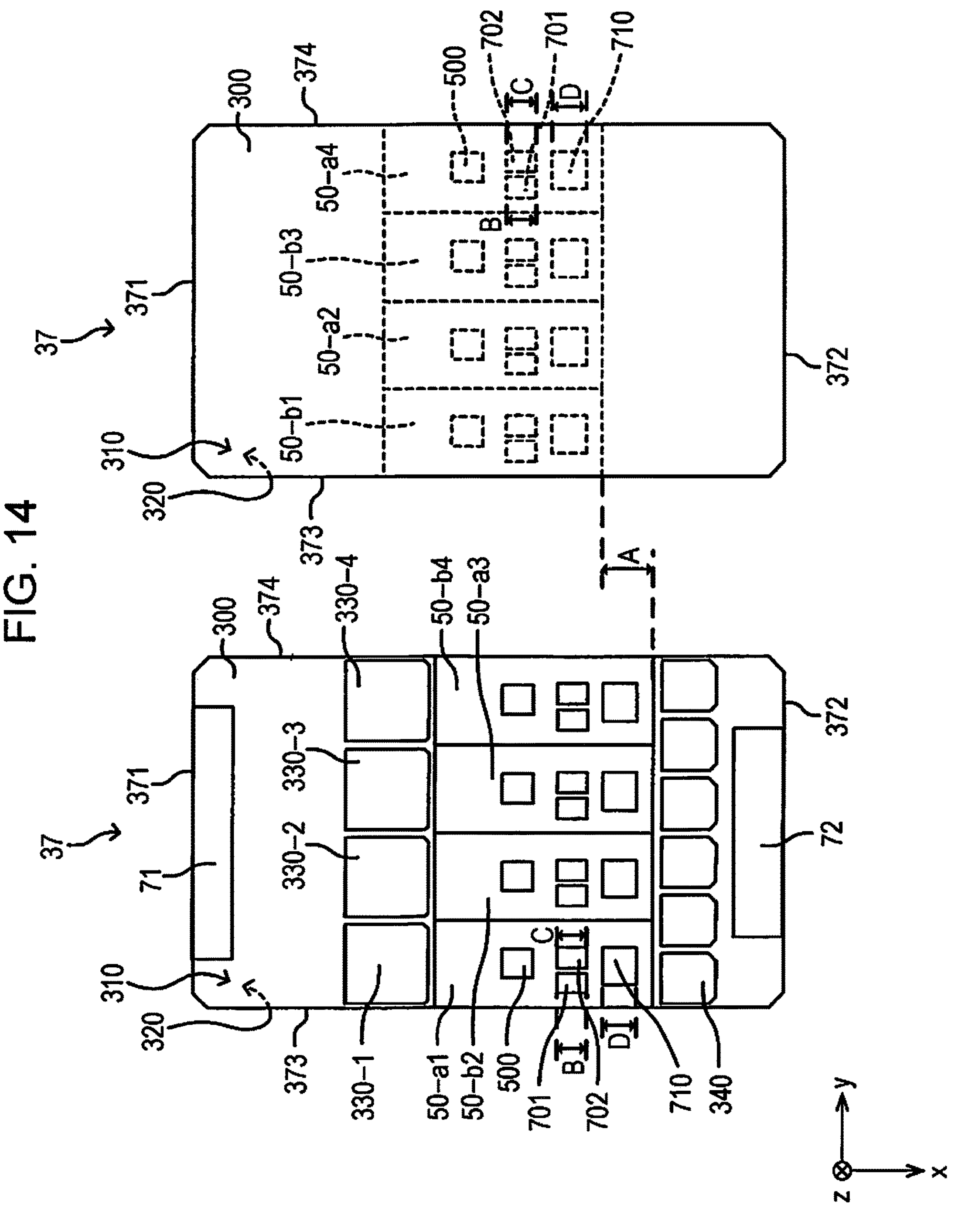
FIG. 14 is a diagram illustrating a substrate configuration of drive circuit units according to a second embodiment.

FIG. 14 is a diagram illustrating a substrate configuration of the drive circuit unit 37 according to the second embodiment. The broken line area in FIG. 14 corresponds to a configuration of circuit components mounted on a second surface 320. Here, in FIG. 14, a description is made by assuming that a direction from a short side 371 to a short side 372 of a substrate 300, that is, a direction parallel to a long side 373 is "long side direction x", and a direction from the long side 373 to the long side 374, that is, a direction parallel to the short side 371 is "short side direction y", and a direction from the first surface 310 to the second surface of the substrate 300 is "depth direction z".

The drive circuit unit 37 includes a substrate 300, and a drive circuit input connector 71 and a drive circuit output connector 72, four pairs of drive circuits 50-a1 and 50-b1, drive circuits 50-a2 and 50-b2, drive circuits 50-a3 and 50-b3, and drive circuits 50-a4 and 50-b4, capacitors 330-1, 330-2, 330-3, and 330-4, and two or more capacitors 340, which are mounted on the substrate 300.

Similar to the first embodiment, the substrate 300 has a planar shape, which is approximately rectangular, and is formed so as to include a pair of short sides 371 and 372 and a pair of long sides 373 and 374.

A configuration of the first surface 310 of the substrate 300 according to the second embodiment is described with reference to FIG. 14.

The diagram illustrated on the left side of the FIG. 14 is a view when viewed from the first surface 310 of the drive circuit unit 37.

Similar to the first embodiment, on the first surface 310 of the substrate 300, the drive circuit input connector 71 and the drive circuit output connector 72 are disposed so as to face each other. Specifically, the drive circuit input connector 71 is mounted along the short side 371, and the drive circuit output connector 72 is mounted along the short side 372.

The drive circuits 50-a1, 50-b2, 50-a3, and 50-b4 are mounted side by side in the short side direction y in this order in an area between the drive circuit input connector 71 and the drive circuit output connector 72 mounted on the first surface 310 of the substrate 300 such that the drive circuit input connector 71 and the drive circuit output connector 72 face each other.

Specifically, an implementation area of the drive circuit 50-a1 is disposed along the long side 373 of the substrate 300. An implementation area of the drive circuit 50-b2 is disposed close to and approximately in parallel to the implementation area of the drive circuit 50-a1 in the short side direction y. An implementation area of the drive circuit 50-a3 is disposed close to and approximately in parallel to the implementation area of the drive circuit 50-b2 in the short side direction y. An implementation area of the drive circuit 50-b4 is disposed close to and approximately in parallel to the implementation area of the drive circuit 50-a3 in the short side direction y, and is also disposed along the long side 374 of the substrate 300.

Similar to the first embodiment, each of implementation areas of the drive circuits 50-a1, 50-b2, 50-a3, and 50-b4 includes an integrated circuit apparatus 500, a high-side transistor 701, a low-side transistor 702, and an inductor 710, and has s similar arrangement to that of the first embodiment.

In the embodiment, on the first surface 310 of the substrate 300, the drive circuit 50-a1 is mounted that outputs a drive signal COMA1 having a large amplitude to the piezoelectric elements 60 of the head 20-1, and the drive circuit 50-b2 is mounted that is close to the drive circuit 50-a1 in the short side direction y of the substrate 300 and outputs a drive signal COMB2 having a small amplitude to the piezoelectric elements 60 of the head 20-2.

That is, in the drive circuit unit 37 according to the embodiment, the drive circuit 50-b2 (example of "third drive circuit") including a high-side transistor 701 (example of "fifth transistor") is mounted on the first surface 310 of the substrate 300. In addition, the drive circuit 50-b2 performs output of the drive signal COMB2 (example of "third drive signal") that drives the piezoelectric elements 60 (example of "second drive elements") of the ejecting sections 600 (example of "second ejecting sections") provided in the head 20-2 and causes liquid to be ejected. Here, the amplitude of the drive signal COMA1 output from the drive circuit 50-a1 is larger than the amplitude of the drive signal COMB2 output from the drive circuit 50-b2.

In addition, in the embodiment, the drive circuit 50-a3 (example of "fourth drive circuit") that is close to the drive circuit 50-b2 in the short side direction y of the substrate 300 and outputs a drive signal COMA3 having a large amplitude to the piezoelectric elements 60 of the head 20-3 is disposed in the drive circuit unit 37.

That is, in the drive circuit unit 37 according to the embodiment, the drive circuit 50-a3 (example of "fourth drive signal") including a high-side transistor 701 (example of "sixth transistor") is mounted on the first surface 310 of the substrate 300. In addition, the drive circuit 50-a3 performs output of the drive signal COMA3 (example of "fourth drive signal") that drives the piezoelectric elements 60 (example of "third drive elements") of the ejecting sections 600 (example of "third ejecting sections") provided in the head 20-3 and causes liquid to be ejected. Here, the amplitude of the drive signal COMA3 output from the drive circuit 50-a3 is larger than the amplitude of the drive signal COMB2 output from the drive circuit 50-b2.

In addition, in the drive circuit unit 37, the drive circuits 50-a1, 50-b2, and 50-a3 are arrayed in the short side direction y in this order. The drive circuit 50-a3 is provided so as to be away from the drive circuit 50-a1 compared with the drive circuit 50-b2. That is, the drive circuits are mounted such that a distance between the high-side transistor 701 (example of "first transistor") provided in the drive circuit 50-a1 and the high-side transistor 701 (example of "fifth transistor") provided in the drive circuit 50-b2 becomes smaller than a distance between the high-side transistor 701 provided in the drive circuit 50-a1 and the high-side transistor 701 (example of "sixth transistor") provided in the drive circuit 50-a3.

In addition, in the embodiment, in the drive circuit unit 37, the drive circuit 50-b4, which outputs a drive signal COMB4 having a small amplitude to the piezoelectric elements 60 of the head 20-4, is disposed close to the drive circuit 50-a3, and along the long side 374 of the substrate 300, that is, on the side that is away from the drive circuit 50-b2.

That is, in the drive circuit unit 37 according to the embodiment, on the first surface 310 of the substrate 300, implementation areas of the drive circuits 50-a1 and 50-a3 that perform output of the respective drive signals COMA1 and COMA3 each having a large amplitude and implementation areas of the drive circuits 50-b2 and 50-b4 that perform output of the respective drive signals COMB2 COMB4 each having a small amplitude are disposed in an alternating pattern.

A configuration of the second surface 320 of the substrate 300 according to the second embodiment is described with reference to FIG. 14.

The diagram illustrated on the right side of FIG. 14 is a perspective view illustrating the configuration of the second surface 320 when viewed from the first surface 310 side of the drive circuit unit 37.

At least the drive circuits 50-b1, 50-a2, 50-b3, and 50-a4 are mounted on the second surface 320 of the substrate 300 so as to be arrayed in this order in the short side direction y.

Specifically, an implementation area of the drive circuit 50-b1 is disposed along the long side 373 of the substrate 300. An implementation area of the drive circuit 50-a2 is disposed close to and approximately in parallel to and the implementation area of the drive circuit 50-b1 in the short side direction y. An implementation area of the drive circuit 50-b3 is disposed close to and approximately in parallel to the implementation area of the drive circuit 50-a2 in the short side direction y. An implementation area of the drive circuit 50-a4 is disposed close to and approximately in parallel to the implementation area of the drive circuit 50-b3 in the short side direction y, and is also disposed along the long side 374 of the substrate 300.

Similar to the first embodiment, each of the implementation areas of the drive circuits 50-b1, 50-a2, 50-b3, and 50-a4 includes an integrated circuit apparatus 500, a high-side transistor 701, a low-side transistor 702, and an inductor 710, and has a similar arrangement to that of the first embodiment.

That is, in the embodiment, in the drive circuit unit 37, on the second surface 320 of the substrate 300, the implementation areas of the drive circuits 50-b1 and 50-b3 that perform output of the respective drive signals COMB1 and COMB3 each having a small amplitude and the implementation areas of the drive circuits 50-a2 and 50-a4 that perform output of the respective drive signals COMA2 and COMA4 each having a large amplitude are disposed in an alternating pattern.

Similar to the first embodiment, in the second embodiment, the drive circuit 50-a1 mounted on the first surface 310 and the drive circuit 50-b1 mounted on the second surface 320, which drive the piezoelectric elements 60 of the same head 20-1, are disposed such that the respective implementation areas overlap one another in the short side direction y, and the drive circuit 50-a1 and the drive circuit 50-b1 are mounted so as to be shifted relative to each other by A and partially overlap one another in the long side direction x.

Similarly, the drive circuit 50-b2 mounted on the first surface 310 and the drive circuit 50-a2 mounted on the second surface 320, which drive the piezoelectric elements 60 of the same head 20-2, are disposed such that the respective implementation areas overlap one another in the short side direction y, and are shifted relative to each other by A and partially overlap one another in the long side direction x.

Similarly, the drive circuit 50-a3 mounted on the first surface 310 and the drive circuit 50-b3 mounted on the second surface 320, which drive the respective piezoelectric elements 60 of the same head 20-3, are disposed such that the respective implementation areas overlap one another in the short side direction y, and are shifted relative to each other by A and partially overlap one another in the long side direction x.

Similarly, the drive circuit 50-b4 mounted on the first surface 310 and the drive circuit 50-a4 mounted on the second surface 320, which drive the respective piezoelectric elements 60 of the same head 20-4, are disposed such that the respective implementation areas overlap one another in the short side direction y, and are shifted relative to each other by A such that partially overlap one another in the vertical direction x.

As described above, in the drive circuit unit 37 according to the embodiment, the drive circuits 50 are respectively mounted on the first surface 310 and the second surface 320 of the substrate 300, and heat generated in the high-side transistor 701 and the low-side transistor 702 is the largest in the drive circuit 50. In addition, when amplitudes of the drive signals COMA and COMB output from the drive circuits 50 that drive the same head 20 are large, the heating further increases.

In the drive circuit unit 37 according to the embodiment, on the first surface 310 of the substrate 300, the drive circuits 50 that respectively perform output of the drive signals COMA by each of which large heat is generated and the drive circuits 50 that respectively perform output of the drive signals COMB by each of which small heat is generated are disposed in an alternating pattern, and in the second surface 320, the drive circuits 50 respectively perform output of the drive signals COMA by each of which large heat is generated and the drive circuits 50 respectively performs output of the drive signals COMB by each of which small heat is generated are disposed in an alternating pattern. Therefore, in the drive circuit unit 37, heat on the first surface 310 and the second surface 320 of the substrate 300 can be dispersed, and deterioration of characteristics due to heating of the drive circuit unit 37 can be further reduced.

In addition, in the embodiment, similar to the first embodiment, it is preferable that the respective inductors 710 of the four pairs of the drive circuits 50-a1 and 50-b1, the drive circuits 50-a2 and 50-b2, the drive circuits 50-a3 and 50-b3, and the drive circuits 50-a4 and 50-b4 are disposed so as not to overlap one another in the depth direction z.

As a result, similar to the first embodiment, heat generated by the inductors 710 is also dispersed, and heat can be further dispersed in the drive circuit unit 37.

Deterioration of characteristics and a failure of the inductors 710, which are caused by heating in the inductors 710, are prevented, and deterioration of ejecting characteristics due to mutual interference of the inductors 710 can be also prevented.

The embodiments or the modifications are described above, but the invention is not limited to the embodiments or the modifications, and can be implemented in various aspects without departing from the gist thereof. For example, the above-described embodiments and modifications can be combined as appropriated.

The invention includes a configuration substantially the same as the configuration described in the embodiments (for example, a configuration having the same function, method, and result, or a configuration having the same advantage and effect). In addition, the invention includes a configuration in which a non-essential part of the configuration described in the embodiments is replaced. In addition, the invention includes a configuration by which the same operation and effect or the same advantage as the configuration described in the embodiments can be obtained. In addition, the invention includes a configuration obtained by adding a well-known technology to the configuration described in the embodiments.

The entire disclosure of Japanese Patent Application No. 2016-248824, filed Dec. 22, 2016 is expressly incorporated by reference herein.

What is claimed is:

1. A liquid ejecting apparatus comprising:
- a first ejecting section that includes a first drive element and ejects liquid by driving the first drive element;
- a first drive circuit that includes a first transistor and outputs a first drive signal to the first drive element;
- a second drive circuit that includes a second transistor and outputs a second drive signal to the first drive element; and
- a circuit substrate on which the first drive circuit and the second drive circuit are mounted, wherein
- the first drive circuit is mounted on a first surface of the circuit substrate,
- the second drive circuit is mounted on a second surface of the circuit substrate on an opposite side from the first surface, and
- the first transistor and the second transistor are disposed at positions that do not overlap one another in plan view of the circuit substrate.

2. The liquid ejecting apparatus according to claim 1, wherein
- an implementation area of the first drive circuit and an implementation area of the second drive circuit at least partially overlap one another in plan view of the circuit substrate.

3. The liquid ejecting apparatus according to claim 1, wherein
- the first drive circuit includes
  - a first modulation circuit that generates a first modulation signal obtained by pulse-modulating a first source signal,
  - a first amplification section that includes the first transistor and a third transistor and amplifies the first modulation signal to generate a first amplification modulation signal, and
  - a first demodulation circuit that demodulates the first amplification modulation signal to generate the first drive signal,
- the second drive circuit includes
  - a second modulation circuit that generates a second modulation signal obtained by pulse-modulating a second source signal,
  - a second amplification section that includes the second transistor and a fourth transistor and amplifies the second modulation signal to generate a second amplification modulation signal, and
  - a second demodulation circuit that demodulates the second amplification modulation signal to generate the second drive signal, and
- the first transistor is disposed at a position that overlaps with neither the second transistor nor the fourth transistor, and the third transistor is disposed at a position that overlaps with neither the second transistor nor the fourth transistor in plan view of the circuit substrate.

4. The liquid ejecting apparatus according to claim 3, wherein
- the first demodulation circuit includes a first coil,
- the second demodulation circuit includes a second coil, and
- the first coil and the second coil are disposed at positions that do not overlap one another in plan view of the circuit substrate.

5. The liquid ejecting apparatus according to claim 1, wherein
- the first drive signal and the second drive signal are output to the first drive element exclusively.

6. The liquid ejecting apparatus according to claim 1, wherein an amplitude of the first drive signal is larger than an amplitude of the second drive signal.

7. The liquid ejecting apparatus according to claim 1 further comprising:

a second ejecting section that includes a second drive element and ejects liquid by driving the second drive element; and a third drive circuit that includes a fifth transistor and outputs a third drive signal to the second drive element, wherein the third drive circuit is mounted on the first surface of the circuit substrate, and an amplitude of the first drive signal is larger than an amplitude of the third drive signal.

8. The liquid ejecting apparatus according to claim 7 further comprising:

a third ejecting section that includes a third drive element and ejects liquid by driving the third drive element; and a fourth drive circuit that includes a sixth transistor and outputs a fourth drive signal to the third drive element, wherein the fourth drive circuit is mounted on the first surface of the circuit substrate, and an amplitude of the fourth drive signal is larger than an amplitude of the third drive signal, and a distance between the first transistor and the fifth transistor is smaller than a distance between the first transistor and the sixth transistor.

9. The liquid ejecting apparatus according to claim 1, wherein the first ejecting section and the circuit substrate are mounted on a movable carriage.

10. A circuit substrate comprising:

a first drive circuit that includes a first transistor and that outputs a first drive signal that drives a drive element;

a second drive circuit that includes a second transistor and outputs a second drive signal that drives the drive element, wherein the first drive circuit is mounted on a first surface of the circuit substrate, the second drive circuit is mounted on a second surface of the circuit substrate on an opposite side from the first surface, and the first transistor and the second transistor are disposed at positions that do not overlap one another in plan view of the circuit substrate.

11. The liquid ejecting apparatus according to claim 1, wherein the circuit substrate is disposed between the first drive circuit and the second drive circuit.

12. The liquid ejecting apparatus according to claim 2, wherein the implementation area of the first drive circuit and the implementation area of the second drive circuit are disposed so as to overlap each other in a first direction perpendicular to a direction along plan view of the circuit substrate and so as to be shifted relative to each other in a second direction perpendicular to both of the first direction and the direction along plan view of the circuit substrate.

* * * * *